United States Patent
Johnston

(10) Patent No.: US 8,156,739 B2
(45) Date of Patent: Apr. 17, 2012

(54) ADIABATIC EXPANSION HEAT ENGINE AND METHOD OF OPERATING

(76) Inventor: Barry Woods Johnston, Baltimore, MD (US)

(*) Notice: Subject to any disclaimer, the term of this patent is extended or adjusted under 35 U.S.C. 154(b) by 77 days.

(21) Appl. No.: 12/842,237

(22) Filed: Jul. 23, 2010

(65) Prior Publication Data

US 2011/0041506 A1  Feb. 24, 2011

Related U.S. Application Data

(63) Continuation-in-part of application No. PCT/US2009/031863, filed on Jan. 23, 2009.

(60) Provisional application No. 61/366,389, filed on Jul. 21, 2010, provisional application No. 61/022,838, filed on Jan. 23, 2008, provisional application No. 61/090,033, filed on Aug. 19, 2008.

(51) Int. Cl.
*F01B 29/10* (2006.01)

(52) U.S. Cl. .......................... 60/522; 60/525

(58) Field of Classification Search .................. 60/517, 60/522, 525
See application file for complete search history.

(56) References Cited

U.S. PATENT DOCUMENTS

| | | | |
|---|---|---|---|
| 2,801,618 A | 8/1957 | Place et al. | |
| 3,767,325 A | 10/1973 | Schuman | |
| 4,350,012 A | 9/1982 | Folsom et al. | |
| 4,455,825 A | 6/1984 | Pinto | |
| 4,532,766 A * | 8/1985 | White et al. | 60/517 |
| 4,698,973 A | 10/1987 | Johnston | |
| 5,211,017 A | 5/1993 | Pusic | |
| 5,394,700 A | 3/1995 | Steele | |
| 6,004,105 A | 12/1999 | Reynolds | |
| 6,503,072 B2 | 1/2003 | Nardi | |
| 7,121,190 B2 | 10/2006 | Ogawa et al. | |
| 7,581,393 B2 * | 9/2009 | Yaguchi et al. | 60/521 |

FOREIGN PATENT DOCUMENTS

WO  2006/044387 A2  4/2006

OTHER PUBLICATIONS

ISR and WO for PCT/US09/31863 dated Mar. 25, 2009.

* cited by examiner

*Primary Examiner* — Hoang Nguyen
(74) *Attorney, Agent, or Firm* — Lowe Hauptman Ham & Berner LLP

(57) ABSTRACT

In an adiabatic expansion heat engine, adiabatically expanded low pressure fluid is returned to a source of high pressure fluid through a balance of internal pressures or forces that balances out the resistance to the flow of the fluid being pumped from the low pressure to the high pressure with the high pressure fluid metered into the working chamber.

19 Claims, 27 Drawing Sheets

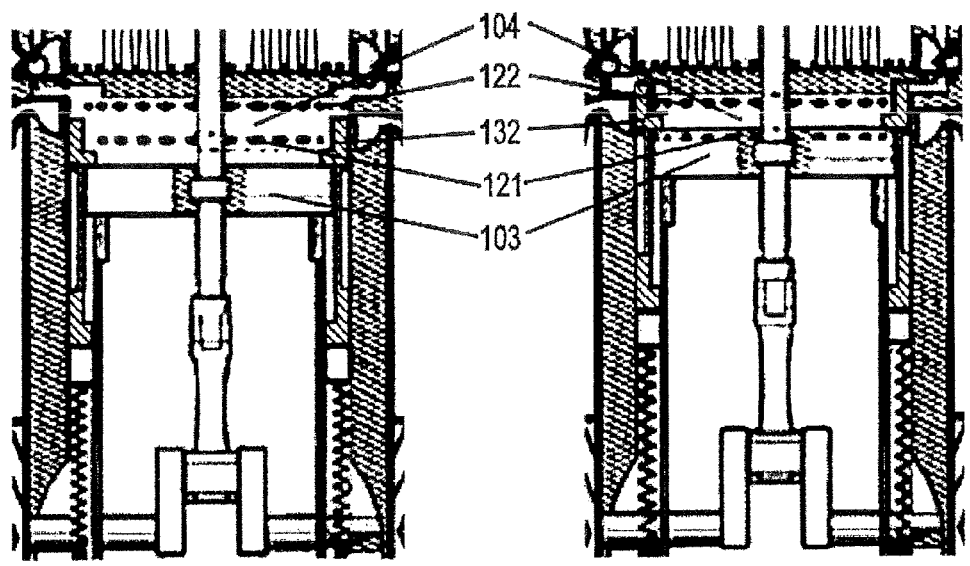
Step 8　　　　　　　　　　　Step 1
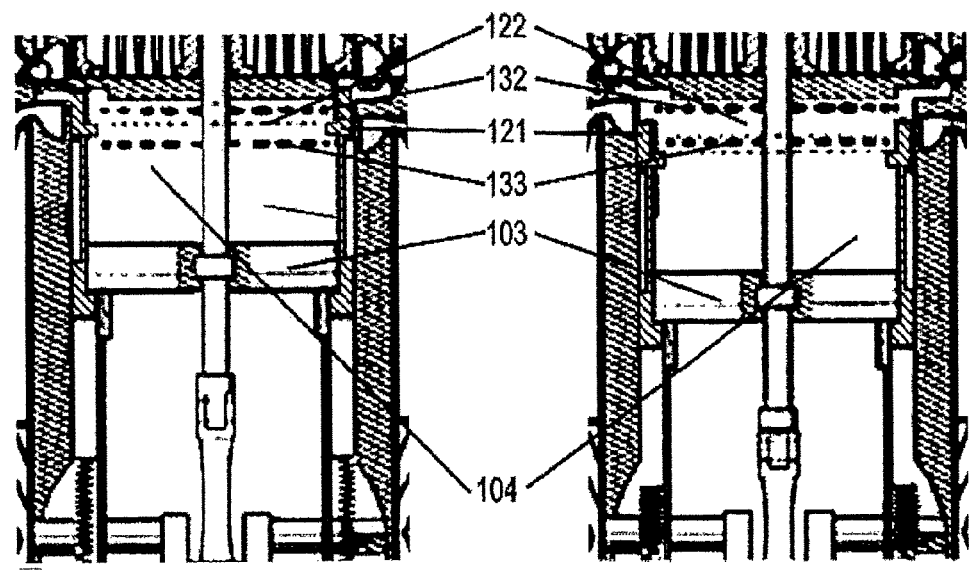
Step 4　　　　　　　　　　　Step 5
Figure 6

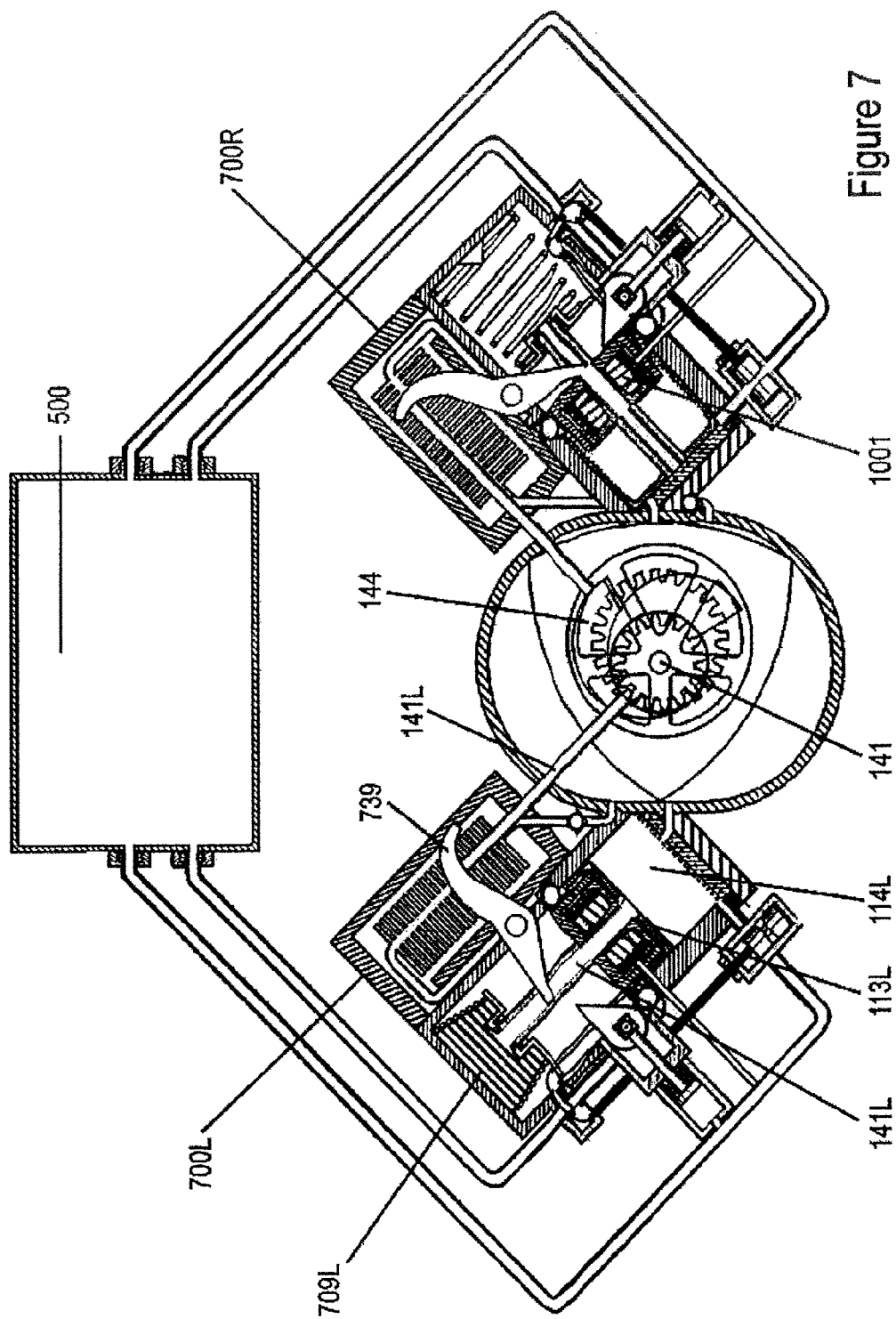

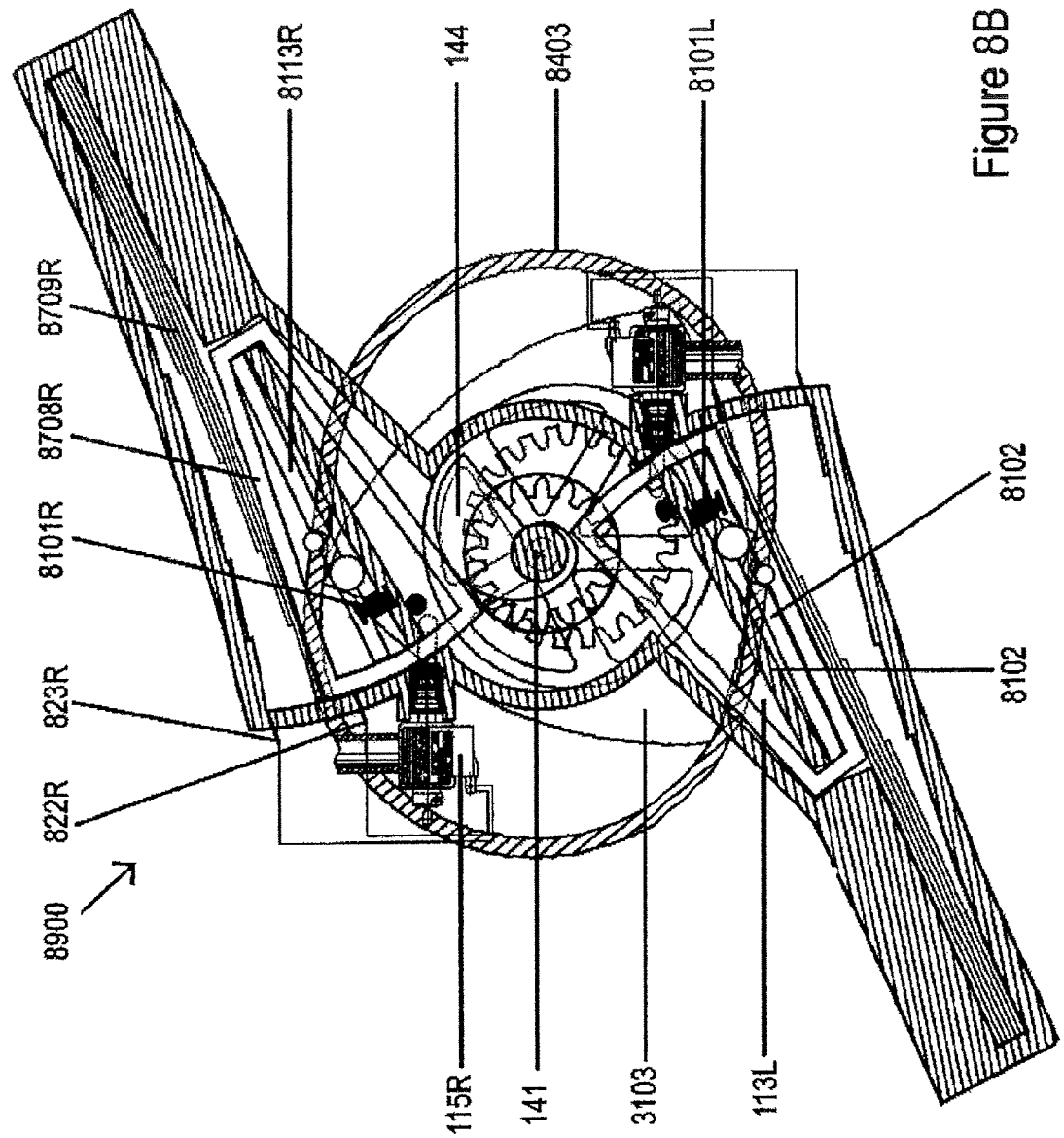

ADIABATIC EXPANSION HEAT ENGINE AND METHOD OF OPERATING

The present application for patent is a continuation in part of International Application No. PCT/US2009/031863 filed Jan. 23, 2009 which designates the United States and claims priority to U.S. Provisional Application No. 61/022,838 filed Jan. 23, 2008 and U.S. Provisional Application No. 61/090,033 filed Aug. 19, 2008. The present application further claims the benefit of Provisional Application No. 61/366,389 filed Jul. 21, 2010. The entire disclosure of all of the above listed PCT and provisional applications is expressly incorporated by reference herein.

The entireties of related U.S. Pat. Nos. 4,698,973, 4,938,117, 4,947,731, 5,806,403, 6,505,538, U.S. Provisional Applications Nos. 60/506,141, 60/618,749, 60/807,299, 60/803,008, 60/868,209, and 60/960,427, and International Applications No. PCT/US05/36180 and PCT/US05/36532 are also incorporated herein by reference.

BACKGROUND

Hundreds of billions of dollars worth of heat energy could be converted into electricity every year, if a cost efficient generator were developed. The Carnot principle indicates that a set amount of energy is available within a given temperature range for heat to power conversion if a way can be found to use it, but the most efficient heat engines, the Stirlings, typically suffer a ~30% efficiency loss of power output. The Stirlings expand and compress the internally cycling working fluid from the volumes incased in the heating and cooling exchangers, but, because the fluid is heated and cooled isothermally during the stroke, some of the added heat cannot be fully converted to the full work output potential and, hence, the 30% efficiency loss.

SUMMARY

In one or more embodiments, an adiabatic expansion heat engine comprises a piston chamber, a power piston and a fluid pump. The power piston is moveable within the piston chamber for running on a working fluid in a high pressure state receivable from a heating exchanger and for exhausting the working fluid in a low pressure state. The fluid pump is for transferring the working fluid in the low pressure state back to the high pressure state of the heating exchanger. The fluid pump comprises a pump piston, and an expansion chamber and a pump chamber which are disposed on opposite sides of the pump piston, and which have varying volumes as the pump piston is moveable between the expansion chamber and the pump chamber. The expansion chamber and the piston chamber are fluidly communicated to define together a working chamber for adiabatic expansion of the working fluid therein during a downstroke of the power piston. The working chamber is controllably, fluidly communicable with the pump chamber during an upstroke of the power piston for compressing the working fluid in the low pressure state into the pump chamber. When the power piston is at or near a top dead center (TDC) thereof, both the working chamber and the pump chamber are controllably, fluidly communicable with the heating exchanger. Thus, pressures on opposite sides of the pump piston are equalized by the working fluid in the high pressure state metering from the heating exchanger, thereby balancing out the resistance to the working fluid being pumped, by a pumping action of the pump piston, from the low pressure state of the pump chamber back to the high pressure state of the heating exchanger.

In one or more embodiments, a method of operating the adiabatic expansion heat engine is also provided.

BRIEF DESCRIPTION OF THE DRAWINGS

The described embodiments are illustrated by way of example, and not by limitation, in the figures of the accompanying drawings, wherein elements having the same reference numeral designations represent like elements throughout, unless otherwise specified.

FIG. 6 is a simplified cross-sectional view of a valve/port mechanism in accordance with a further embodiment.

FIG. 7 is a simplified cross-sectional view of a thermal system in accordance with a further embodiment.

FIGS. 8A-8B are simplified cross-sectional view of fluid pumps in accordance with further embodiments.

DETAILED DESCRIPTION

Figure 1:
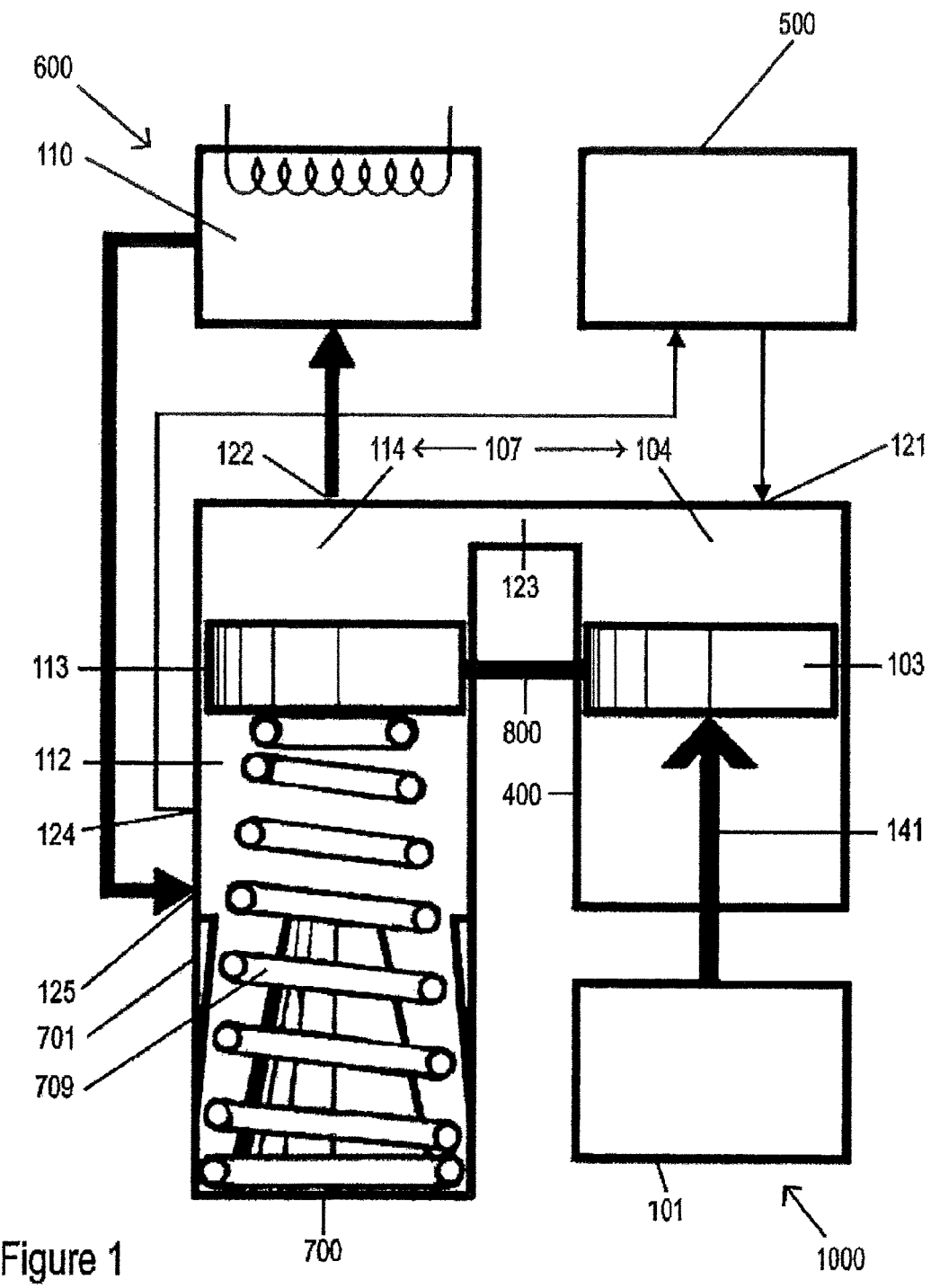
FIG. 1 is a schematic diagram of a thermal system in accordance with an embodiment.

In the following detailed description, for purposes of explanation, numerous specific details are set forth in order to provide a thorough understanding of the specifically disclosed embodiments. It will be apparent, however, that one or more embodiments may be practiced without these specific details. In other instances, well-known structures and devices are schematically shown in order to simplify the drawing.

FIG. 1 is a schematic diagram of a thermal system 1000 which will be referred to herein below as Soony engine 1000.

Soony engine 1000 in an embodiment comprises a heat engine 400, a heating exchanger 500, a cooling exchanger 600, and a fluid pump 700.

Heating exchanger 500 in an embodiment includes a boiler which is a closed vessel in which a working fluid is heated. The working fluid, in an embodiment, is heated under pressure. The steam or vapor of the heated working fluid, which is now in a high pressure state, is then circulated out of heating exchanger 500 for use in engine cylinder 400. The heat source (not shown) for heating exchanger 500 in an embodiment can be the combustion of any type of fossil fuels such as wood, coal, oil, natural gas. In a further embodiment, the heat source can also be solar, electrical, nuclear (e.g., low grade nuclear waste) or the like. The heat source can further be the heat rejected from other processes such as automobile exhausts or factory chimneys etc.

The working fluid can be any type of working fluid that is usable in a heat engine. Examples include, but are not limited to, water, air, hydrogen, helium, carbon dioxide. In an embodiment, R-134 is used as the working fluid. In a further embodiment, helium at, e.g., about 212° F., is utilized.

Cooling exchanger 600 in an embodiment is a shell or tube exchanger which includes a series of tubes, through which the worked working fluid that must be cooled runs. The tubes define a cooling chamber 110. A coolant runs over the tubes so as absorb the required heat from the worked working fluid. Water is used as the coolant in an embodiment. Other coolants, including air, are, however, not excluded.

Heat engine 400 is of a type that runs on the heated working fluid to convert energy of the heated working fluid to useful work, e.g., via output mechanism 101 which can be a crank shaft or an electric generator or the like. The heated working fluid enters heat engine 400 via inlet port 121 and exhausts from heat engine 400 via exhaust port 122 to cooling exchanger 600. During the transfer of heat transferred from heating exchanger 500 to cooling exchanger 600, some of the heat is converted into useful work by output mechanism 101. Heat engine 400 comprises a power piston 103 moveable within a cylinder (unnumbered) of heat engine 400 between TDC (top dead center) and BDC (bottom dead center), including the rotary motion of a Wankel engine as will be described herein below in some embodiments. The internal volume, designated at 104 in FIG. 1, of the cylinder between the crown of power piston 103 and the cylinder wall at TDC defines a piston chamber in the down stroke of power piston 103 as well as a compression chamber in the upstroke of power piston 103. A power piston shaft 141 connects power piston 103 to output mechanism 101 for transferring work generated by heat engine 400 to the outside during the downstroke and for driving power piston 103 to exhaust the worked working fluid in the upstroke, and the negative work during compression as will be described herein below in some embodiments.

Examples of engine cylinder 400 includes, but are not limited to, multi-cylinder uni-flow engines disclosed in the patents and applications listed at the beginning of this specification, especially U.S. Pat. Nos. 5,806,403 and 6,505,538.

Fluid pump 700 is provided to move the worked working fluid in a low pressure state back to heating exchanger 500 which is in the high pressure state. In some embodiments, fluid pump 700 allows the expanded working fluid to be moved back to heating exchanger 500 without a vapor-liquid phase change. Fluid pump 700 includes a pump chamber 701 divided into two pump sub-chambers 114 and 112 by a displaceable pump piston 113. Pump piston 113 is operatively, controllably driven by power piston 103 of heat engine 400 via connector 800 which allows pump piston 113 to follow power piston 103 during a certain period (e.g., the upstroke) and to be independent of power piston 103 during another period (e.g., the downstroke) of a cycle of Soony Engine 1000. Pump piston 113 is further biased by a biasing element 709. In some embodiments, biasing element 709 comprises a spring, e.g., a tension spring as exemplified in FIG. 2, that pulls pump piston 113 in a direction that minimizes the volume of second pump sub-chamber 112. Further embodiments include a compression spring. Other configurations of biasing element 709, such as air cylinders or any kind of actuators that can force the fluid pump closed at an appropriate time as described herein below, are used in one or more embodiments.

First pump sub-chamber 114 is communicable with piston chamber 104 of heat engine 400 via connection 123 and defines an expansion chamber in the down stroke of power piston 103 as well as a pump displacement chamber in the upstroke of power piston 103. Exhaust port 122 in an embodiment is provided in first pump sub-chamber 114 for fluid communication between cooling exchanger 600 and first pump sub-chamber 114. Other arrangements are, however, not excluded. For example, one or more exhaust port(s) 122 in further embodiments is/are provided in first pump sub-chamber 114 and/or piston chamber 104 and/or connection 123. Likewise, one or more inlet port(s) 121 in some embodiments is/are provided in first pump sub-chamber 114 and/or piston chamber 104 and/or connection 123. The first sub-chamber has dual functions of an expansion chamber and a pump displacement chamber, as will be described herein below in some embodiments, and may be referred to in the description herein below as "expansion chamber" (collectively with the piston chamber) or as "pump displacement chamber".

Second pump sub-chamber 112 is communicable with heating exchanger 500 via a pump outlet port 124 and with cooling exchanger 600 via a pump inlet port 125. One or more control elements, such as check valves, are provided in one or more ports 121, 122, 124, 125 for controllably opening and closing the respective ports during operation of Soony engine 1000. A valve/port control mechanism (not shown) is also provided in further embodiments for controlling the opening and/or closure of one or more of ports 121, 122, 124, 125. The second pump sub-chamber may be referred to in the description herein below as "pump". The "pump is closed or shut" when the second pump sub-chamber is at or near its minimal volume (zero in some embodiments) after a pumping action as will be described herein below in one or more embodiments. The "pump is full" when the second pump sub-chamber is at or near its maximal volume (the entire volume of the pump's chamber in some embodiments) just before a pumping action as will be described herein below in one or more embodiments.

Figure 2:
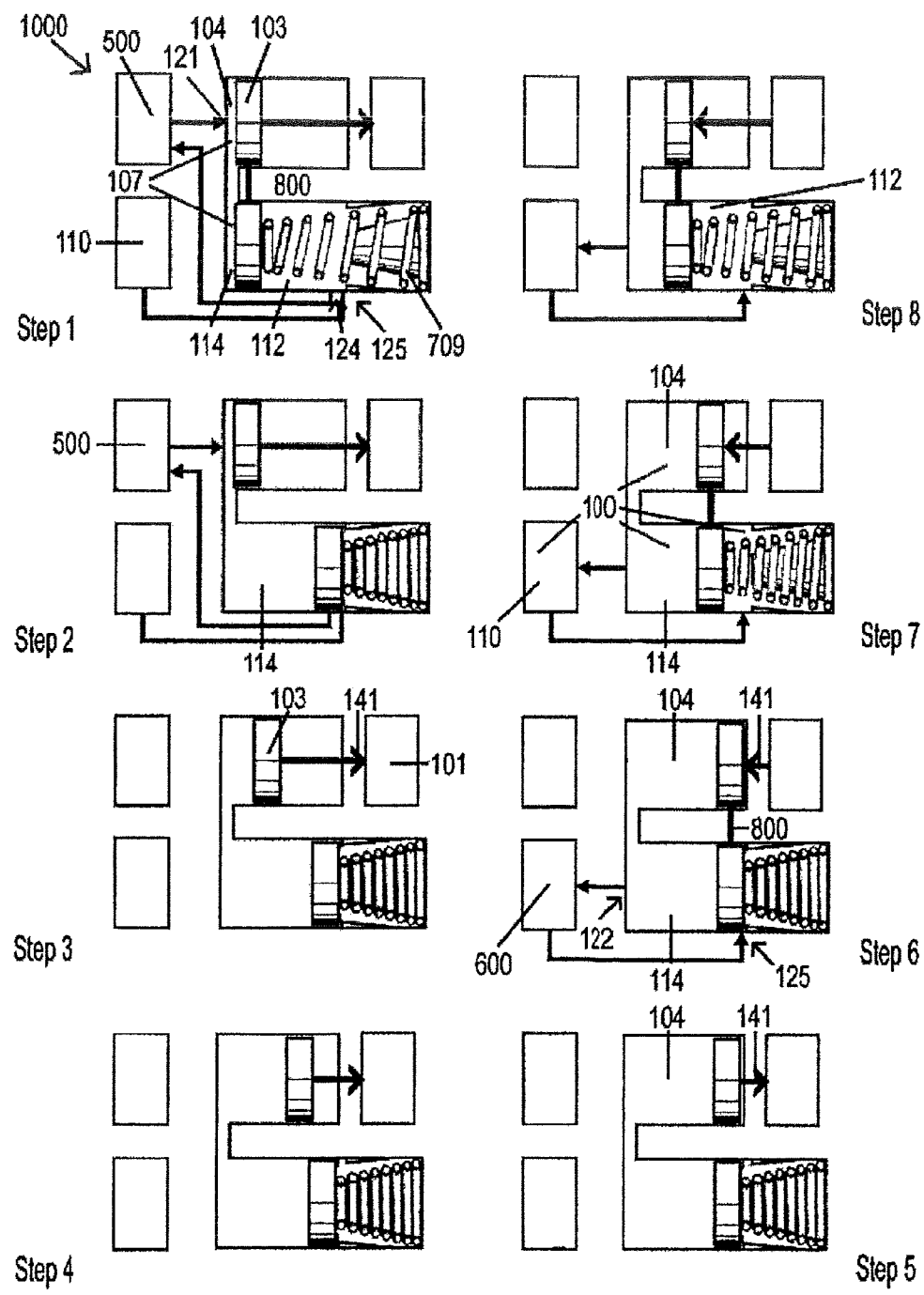
FIG. 2 includes multiple views that illustrate numerous steps during one cycle of the system of FIG. 1.

One operational cycle of Soony engine 1000 will be now described with reference to FIG. 2 which includes multiple views similar to FIG. 1 that illustrate numerous steps during the operation of Soony engine 1000. Only reference numerals that are necessary for the description of a particular step are depicted in FIG. 2.

To understand the engine operation, three aspects of the cycle should be noted:

1) the nature of the positive work output occurring in an expansion chamber 107 (illustrated in Step 1 of FIG. 2) that comprises piston chamber 104 and first pump sub-chamber 114 which are being expanded together during the downstroke of power piston 103; and 2) the nature of the anti-work being caused by the recompression occurring in a cooling expended chamber 100 (illustrated in Step 7 of FIG. 2) that comprises piston chamber 104 (now functioning as a compression chamber), first pump sub-chamber 114 (now functioning as a pump displacement chamber) 114, cooling chamber 110 of cooling exchanger 600, and second pump sub-chamber 112 which are being both cooled and compressed simultaneously during the downstroke of power piston 103; and 3) the effective balance of work output due to the pressure differential between the expansion 1) and compression 2).

The positive work 1) of 1000 engine 1000 is created by the expansion of the high pressure, heated working fluid toward a low pressure exhaust sink (e.g., cooling exchanger 600).

The negative work 2) in cooling expended chamber 100 is the work imposed on the working fluid during compression and cooling. Contraction of the working fluid is caused by both compression and the raking off of heat while being passed through cooling chamber 110 of cooling exchanger 600.

The work 3) in particular is created by the work or the pressure differential occurring between the expanding volume in the expansion chamber 107 and the contracting volume of cooling expended chamber 100 as power piston 103 travels between Top Dead Center (TDC) and Bottom Dead Center (BDC).

Step 1

Step 1 shows Soony Engine 1000 just before the pumping action. At or near TDC, e.g., at or the end of the upstroke of power piston 103, the heated working fluid at high pressure from heating exchanger 500 is injected into the minimal volume of expansion chamber 107 via inlet port 121 which is briefly opened (for Steps 1 and 2). Specifically, the working fluid in heating exchanger 500 is accessed to both piston chamber 104 and first pump sub-chamber 114 via inlet port 121. The minimal volume of expansion chamber 107 in some embodiments should be as close to zero as possible. As will be apparent from the description herein below, second pump sub-chamber 112 is full of the cooled and compressed working fluid. The connection between cooling chamber 110 and second pump sub-chamber 112 is shown in Step 1, indicating that the cooled and compressed working fluid might (in some embodiments) or might not (in other embodiments) be flowing into second pump sub-chamber 112 from cooling chamber 110. In some embodiments, the cooled and compressed working fluid is prevented from flowing backward into cooling chamber 110 (especially during the pumping action), by, e.g., a check valve at pump inlet port 125. Biasing element 709, e.g., a pulling spring, is cocked. Connector 800 is enabled to connect power piston 103 and pump piston 113. The injected working fluid from heating exchanger 500 is to achieve a balance of internal forces, for allowing fluid pump 700 to pump its load (in second pump sub-chamber 112) back into heating exchanger 500 as will be described immediately below.

Step 2

Step 2 shows Soony Engine 1000 just after the completion of the pumping action. Connector 800 is disabled to release the connection between power piston 103 and pump piston 113. The release of connector 800 in the specifically depicted embodiment is effected after inlet port 121 is opened for accessing the heated working fluid from heating exchanger 500 into expansion chamber 107. However, it is not excluded that, in some other embodiments, connector 800 is disabled at or slightly before the opening of inlet port 121. After connector 800 has been released, pump piston 113 is subject only to the biasing action of biasing element 709 which forces pump piston 113 toward a closed pump position as depicted at Step 2 in FIG. 2. The cooled and compressed working fluid in second pump sub-chamber 112 is pumped by pump piston 113, through pump outlet port 124 which is now opened, back into heating exchanger 500. Since the pressures are equalized by the presence of the heated working fluid on both sides of pump piston 113, only a small amount of energy is required for biasing element 709 to pump the pump's load back into heating exchanger 500. Pump piston 113 is stopped at the closed pump position as shown at Step 2 in FIG. 2. The presence of pump piston 113 at or near the closed pump position closes pump outlet port 124, either by the body of pump piston 113 or via the valve/port control mechanism mentioned above. The volume of second pump sub-chamber 112 at the closed pump position in some embodiments should be as close to zero as possible. In expansion chamber 107, the heated working fluid begins to expand and move power piston 103 towards BDC.

Step 3

Step 3 shows Soony Engine 1000 in an early stage of the expansion (down) stroke. Inlet port 121 has been closed so that the expansion occurs in isolation within expansion chamber 107. In Step 3, expansion chamber 107, including piston chamber 104 and first pump sub-chamber 114, is closed off from both heating exchanger 500 and cooling exchanger 600. Power piston 103 begins the downstroke allowing the working fluid to expand adiabatically. The downstroke of pump piston 113 generates work that is output to output mechanism 101 via power piston shaft 141. Pump piston 113 is kept by biasing element 709 at the closed pump position.

Step 4

Step 4 shows Soony Engine 1000 near the completion of the expansion (down) stroke. The working fluid in expansion chamber 107 continues to expand toward BDC, in isolation from heating exchanger 500 and cooling exchanger 600.

Step 5

Step 5 shows Soony Engine 1000 at the end of the expansion (down) stroke and, hence, the beginning of the compression (up) stroke. Piston chamber 104 and first pump sub-chamber 114 are being converted from an expansion chamber to a compression chamber. Power piston shaft 141 is being converted from (a) transferring positive work from the expansion of the working fluid to the outside to (b) transferring negative work from the outside to drive the subsequent compression of the worked working fluid. Power piston 103 has completed its downstroke and reached BDC. Exhaust port 122 is opened to cooling exchanger 600. Piston chamber 104 and first pump sub-chamber 114 now convert to a compression chamber and a pump displacement chamber, respectively, so that the working fluid can be forced into cooling exchanger 600. The power output downstroke shifts to the compression input upstroke in preparation for the compression of Step 6.

Step 6

Step 6 shows Soony Engine 1000 in an early stage of the compression (up) stroke. Connector 800 is re-enabled to connect power piston 103 and pump piston 113. Thus, pump piston 113 moves from the closed pump position with power piston 103 during the latter's upstroke. It should be noted that, during each cycle, at BDC, expansion chamber 107 changes mode to become cooling expended chamber 100 (best illustrated in Step 7 of FIG. 2) with the expended working fluid now being compressed and cooled simultaneously. The compression input upstroke, which causes anti-work (via power piston shaft 141) from the engine output (now functioning as a compression unit), takes the expended working fluid in piston chamber 104 (now functioning as a compression chamber) 104 and first pump sub-chamber 114 (now functioning as a pump displacement chamber) and begins compression. Exhaust port 122 and pump inlet port 125 are opened, accessing the recompressed expended working fluid from pump displacement chamber 114 into cooling exchanger 600. Then, the cooled and compressed working fluid is forced into second pump sub-chamber 112 still by the upstroke movement of power piston 103 and pump piston 113.

Step 7

Step 7 shows Soony Engine 1000 midway through its compression (up) stroke Compression chamber 104 continues to close as power piston 103 encroaches on the volume of compression chamber 104. It should be noted that the pressures on both sides of pump piston 113 are equalized. The compression input (schematically depicted at Steps 6-8 in FIG. 2) is caused by the anti-work being imposed on the positive work output of heat engine 400.

Step 8

Step 8 shows Soony Engine 1000 near the completion of the compression (up) stroke. Second pump sub-chamber 112 is nearing being completely full and is approaching being ready to dump its pump load into heating exchanger 500. Soony Engine 1000 is ready to begin Step 1 again.

Figure 9A:
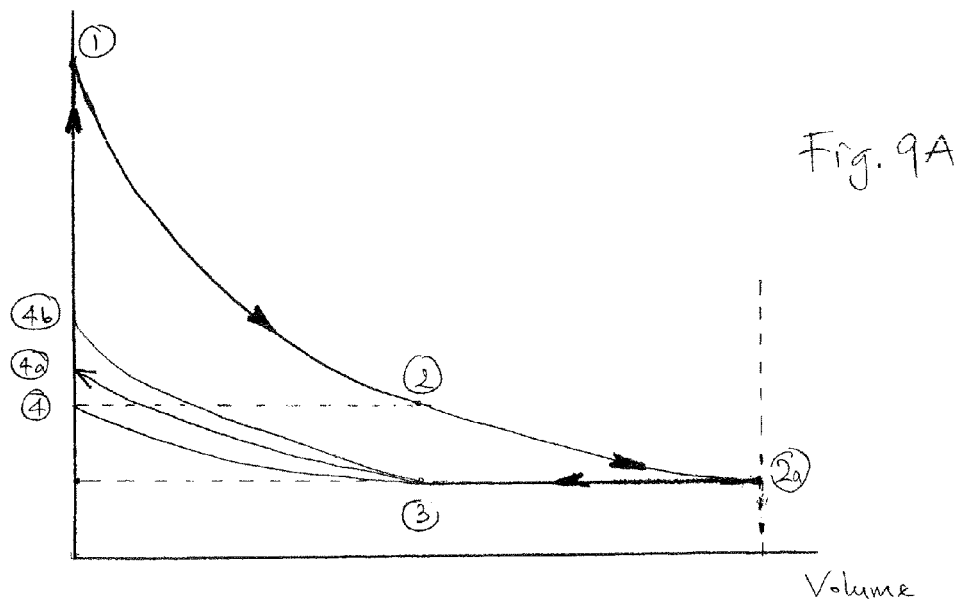
FIGS. 9A and 9B are graphs showing a thermal cycle of an engine in accordance with an embodiment.
Figure 9B:
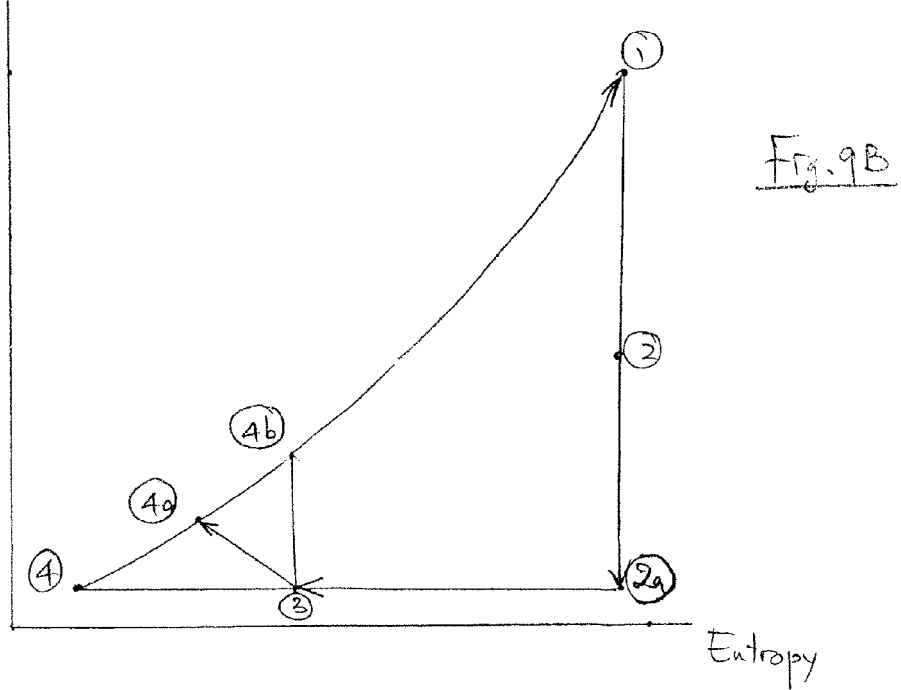

The thermal cycle of Soony Engine 1000 will be described with reference to FIGS. 9A and 9B which are graphs showing different states of the working fluid through the thermal cycle, wherein FIG. 9A is a Pressure vs. Volume graph and FIG. 9B is a Temperature vs. Entropy graph.

The thermal cycle starts at point ① which corresponds to Step 2 where the pump piston 113 and power piston 103 are at the TDC. The pressure, temperature and entropy of the working fluid, which just enters the expansion chamber 107 from heating exchanger 500, is at or near their maximums, while the volume of the working fluid is at or near the minimum.

During the down stroke (Steps 2-5), the working fluid expands adiabatically as explained herein. The thermal cycle reaches point ② on the graphs of FIGS. 9A, 9B, which corresponds to Step 5 where the power piston 103 and pump piston 113 are at their BDCs.

At Step 6 corresponding to point ②a, the check valve in exhaust port 122 is open to access cooling exchanger 600. The volume of the working fluid in expansion chamber 107 instantaneously increases (from point ② to point ②a in FIG. 9A) due to the addition of the volume of the cooling exchanger 600. At the same time, the temperature of the working fluid drops (from point ② to point ②a in FIG. 9A). The process from point ① to point ②a is adiabatic.

The working fluid entering the cooling exchanger 600 is cooled down to point ③, and then compressed to point ④a during the upstroke of Steps 6-8. The upstroke between point ③ and point ②a is partially adiabatic or quasi-adiabatic because the working fluid is compressed in thermally isolated second pump sub-chamber 112. For comparison, two hypothetical points ④ and ④b for an isothermal compression upstroke (point ③ to point ④) and a fully adiabatic compression upstroke (point ③ to point ④b) are also illustrated in FIGS. 9A-9B. Point 4, ④a and ④b correspond to Step 1 where the power piston 103 and pump piston 113 are at their TDCs just before the injection of hot working fluid from the heating exchanger 500.

At Step 2, the hot working fluid is injected from the heating exchanger 500 and the connector 800 is released causing a pumping action from point ④a to point ① to occur.

The above description focuses on the action of one power cylinder of heat engine 400 as it goes through its expansion and compression cycle. In some embodiments, heat engine 400 of Soony Engine 1000 comprises more than one cylinders each with its own fluid pump 700 and cooling chamber 110. For example, heat engine 400 in an embodiment has four power cylinders that are offset by 90° degrees from each other, all acting on a common drive shaft connected to power piston shaft 141 of each power cylinder for ensuring continuous rotational work output. The positive expansion work of one or more power cylinders is partially used to perform the negative compression work of the other power cylinder(s).

In one or more embodiments, cooling chamber 110 and/or the heat exchanger chamber of heating exchanger 500 is/are configured as large (in comparison with the other chambers of the thermal system) as is/are practical.

In one or more embodiments, the pressure in cooling chamber 110 is retained, by, e.g., a check valve in exhaust port 122 between expansion chamber 107 and cooling chamber 110. The pressure in cooling chamber 110 is held in check, in some embodiments, near the system's medium pressure, e.g., about 373 psi as in the Example described herein below. Due to the presence of the check valve, the expanded working fluid is not immediately moved into cooling chamber 110 at the beginning of the compression stroke (Step 6 of FIG. 2).

Instead, the worked working fluid is first compressed within piston chamber 104 and first pump sub-chamber 114 in the early stage of the compression stroke (Step 7 of FIG. 2). The pressure within the still isolated piston chamber 104 and first pump sub-chamber 114 rises from the system's minimum pressure, e.g., about 255 psi as in the Example described herein below. At the same time, the pressure in cooling chamber 110, which is now connected to second pump sub-chamber 112 as pump inlet port 125 is opened, slightly decreases, e.g., to about 306 psi as in the Example described herein below, due to the added, increasing volume of second pump sub-chamber 112. The pressure in second pump sub-chamber 112 during the early stage of the compression stroke is higher than that in the first pump sub-chamber 114, and assists in the opening of the pump, i.e., facilitates the upward movement of the pump piston 113 towards its TDC. For this reason, in some embodiments, it is not necessary to immediately enable connector 800 at the beginning of the compression stroke, allowing pump piston 113 to "float" toward its TDC under the pressure differential between second pump sub-chamber 112 and first pump sub-chamber 114 until the pressures in the two pump sub-chambers are equalized.

Once the pressure equalization occurs between first pump sub-chamber 114 and second pump sub-chamber 112, pump piston 113 is forcibly moved by power piston 103, through the now enabled connector 800, towards TDC thereby further compressing the worked working fluid in piston chamber 104 and first pump sub-chamber 114. When the pressure of the worked and compressed working fluid in first pump sub-chamber 114 and piston chamber 104 reaches the opening pressure of the check valve in exhaust port 122, exhaust port 122 is opened and the compressed working fluid is pushed into cooling chamber 110, thereby re-raising the pressure in cooling chamber 110 and second pump sub-chamber 112 to the desired level, e.g., from 306 to 373 psi as in the Example described herein below. The compressed working fluid pushed by power piston 103 and pump piston 113 into cooling chamber 110 is cooled by the coolant of cooling exchanger 600 to a lower entropy. The cooled and compressed working fluid is subsequently moved into second pump sub-chamber 112.

Embodiments that both provide a large volume cooling chamber 110 and hold the pressure in that large cooling chamber 110 in check will both prevent (a) turbulence between cooling chamber 110 and expansion chamber 107, and (b) the working fluid in second pump sub-chamber 112 from being compressed without the removal of its heat. Retaining cooling chamber 110 and second pump sub-chamber 112 at the near medium pressure in some embodiments will stabilize the pressure in second pump sub-chamber 112 which will improve the capacity for heat absorption during the compression phase of the working fluid in the overall compression chamber during the upstroke. Note that the lower pressure equalization in fluid pump 700 at the early stage of the upstroke will assist in the opening of fluid pump 700, just as the higher pressure equalization in fluid pump 700 will assist in the rapid closing of fluid pump 700 at TDC.

In one or more embodiments, the pumping action described at Steps 1 and 2 swaps a volume of the cooled and compressed working fluid in second pump sub-chamber 112 (Step 1) for the same volume of the heated working fluid in first pump sub-chamber 114 (Step 2). In such embodiments, Soony Engine 1000 exchanges volumes at a much more rapid rate than a typical Stirling engine can exchange heat. For a typical Stirling engine, the unavoidable delay in this heat exchange process is the reason the typical Stirling engine suffers an about 30% loss of thermal efficiency. Specifically, the typical Stirling engine loses work output because the working fluid is absorbing heat during the working stroke so that some of the work output occurs before the working fluid is fully heated. Thus, volume exchange in one or more embodiments of Soony Engine 1000 can be more deliberate and rapid than heat exchange in the typical Stirling engine.

In an aspect, unlike the typical Stirling engine, Soony Engine 1000 in accordance with one or more embodiments cycles its volume of the working fluid (from second pump sub-chamber 112) out so that it can be fully heated before being injected back into the working cylinder of heat engine 400. This allows the working fluid to realize its full work output potential. Likewise, the working fluid is completely cooled in one or more embodiments during the compression phase of the cycle. Therefore, Soony Engine 1000 in one or more embodiments provides the full breadth of the Carnot bracket, utilizing some or most of the wasted 30% suffered efficiency loss by the typical Stirling engine.

In one or more embodiments, the 30% efficiency loss by the typical Stirling engine can be recouped by (a) rapid closing action of fluid pump 700 and/or (b) insignificant loss due to cocking of biasing element 709. The former, i.e., rapid closing action of fluid pump 700, is achievable because the equalization of pressures on opposite sides of pump piston 113 allows the biasing force for pumping action to act with little power loss. Soony Engine 1000 in one or more embodiments does not force the working fluid to circulate, but allows for it. In a balanced pressure environment, biasing element 709 actually causes the closing (Step 2, FIG. 2) of fluid pump 700. The force of biasing element 709 is loaded stored (Step 1, FIG. 2) until the moment of opportunity at TDC when the equalization occurs, allowing for the rapid pump closing action. Fluid pump 700 is opened, in one or more embodiments, also under balanced pressure conditions (Steps 6-8, FIG. 2) by connector 800 which cocks biasing element 709 in preparation for the moment of opportunity at TDC. The latter, i.e., the loss due to cocking of biasing element 709, is in some embodiments insignificant, e.g., 4.5-5%, in comparison with the 30% efficiency loss by the typical Stirling engine, and yet the force of biasing element 709 is still strong enough for pump piston 113 to move, and fast enough to overcome the mass weight of the pumping mechanism in the time frame.

In a further aspect, the balance of internal pressures within Soony Engine 1000 in accordance with one or more embodiments during the pump opening (Steps 5-8) and pump closing (Steps 1-2) of fluid pump 700 allows the working fluid to fully circulate and to be fully heated before entering heat engine 400 and/or to be fully cooled during compression. The configuration of Soony Engine 1000 in one or more embodiments capitalizes on a momentary window of opportunity during the cycle when there is a momentary balance of internal forces within the engine that allows for the rapid transfer of the working fluid from the low temperature/pressure to the high temperature/pressure without great expenditure of energy or by suffering the typical losses occurring in other engines including the typical Stirling engine. In this aspect, Soony Engine 1000 is a new breed of heat engine which is not a Brayton, a Rankin, an Ericsson nor a standard Stirling engine. It is a near Carnot, near adiabatic engine.

Although Helium has been described as the working fluid in the above description, other media including, but not limited to, hydrogen, carbon dioxide, or air, are not excluded. Helium gas is suitable for the described example as an ideal working fluid because it is inert and very closely resembles a perfect gas, therefore, providing the optimum heat to work conversion. The closer the boiling point is to absolute zero, the better its Carnot potential. The greater the viscosity, the less leakage will occur.

Further embodiments can also be modified to optimize the expansion capability of the working fluid, being heated, e.g., by solar and stack waste heat to drive the Soony engine under varying heat/pressure conditions. Such modified example includes a mechanism that controls and self-adjusts the volumes of expansion chamber 107 and cooling expended chamber 100 in order to accommodate the variable temperature/pressure conditions being imposed by the varying temperatures between, e.g., 170° F. to 300° F., corresponding to lower solar insolation in the winter and higher insolation during the summer, respectively. With higher temperatures and pressures the overall Soony efficiency will improve significantly because the work output will be significantly greater than the negative work required to cock the bias mechanism.

EXAMPLE

A particular Example of an embodiment of Soony Engine 1000 will now be described.

The Example is a highly efficient 25-kW CHP engine that generates electric power as a standalone for large thermal solar power plants. The Soony engine in this embodiment has an adiabatic configuration which approaches Carnot efficiency. The reason for the high efficiency is that the working gas that passes through the engine expands adiabatically with a relatively low mechanical cost to the efficiency. In a turbine, the light weight fins of the turbine all rotate in a central shaft, catching the adiabatic expansion work as it passes through the turbine, but with the problem of high RPMs. The Soony engine in this embodiment addresses the same issues as a turbine, achieving an adiabatic expansion with a low cost of the cycling mechanism, but operates at low RPMs.

The mechanical cost of cycling the working fluid back into the Hot Heating Exchanger (e.g., 500 in FIG. 1) is largely a factor of the actual mass weight of the cycling pump mechanism and the distance of travel of its piston. The Example has a mechanism that is as lightweight as possible to compete with the light weight fins of turbines. Carbon fiber reinforced materials or titanium are exemplary materials. The Soony engine in this embodiment operates in a balanced pressure environment and, therefore, does not cause a great deal of drag on the engine efficiency.

A purpose of this particular embodiment is to trim down the weight and travel of the Soony engine mechanism to a minimal.

Based on Carnot potential between 922.22° K to ambient 289.15° K, the Carnot efficiency is 68.5% Carnot. The Example can capture 64.6% which is 94.31% of that 68.65% Carnot, with a maximum of 20% mechanical loss, and with the electric generator expected to be 98% efficient, the total heat conversion to electricity will be 49.8%. The Soony engine in this embodiment works by expanding and compressing its working fluid like a Stirling engine; however, Stirling engines lose work output because the working fluid absorbs heat isothermally during the working stroke. The expansion and contraction in the Soony engine in this embodiment is adiabatic, resembling a Carnot cycle.

The positive work output during the expansion downstroke of the engine of this embodiment between points ① and ② is adiabatic. The negative work input during the recompression phase or upstroke between points ②, ③ to ④a is divided between the adiabatic action in the Working Chamber (expansion chamber 107—upstroke) of the engine, the essentially isothermal action occurring in the Cooling Chamber (cooling exchanger 600), and the essentially adiabatic action occurring within the Pump Chamber (second pump sub-chamber 112). The volume in the Cooling Chamber is assumed to be equal to the volume in the Pump Chamber. Of course, the work or anti-work that occurs is acting on or against the Working Piston in the Working Chamber. When the upstroke begins, the higher pressure of the expanded working fluid in the Working Chamber (upstroke) is accessed to the lower pressure and temperature in the Cooling Chamber and the two strike a mutual lower pressure balance. At that point, the Pump Chamber is only beginning to open. Therefore, the total volume being compressed is the combined volume in both the Working Chamber (upstroke) and Cooling Chamber, as the Pump Chamber begins to open. The play of pressures, temperatures, and entropy is determined by the interrelationship of these three volumes.

In the particular Example, during the upstroke, the Working Chamber volume will compress from 0.62913 $m^3$/kg to zero (including the negative volume displacement occurring in the Expansion/Pump Chamber, while the volume in the Cooling Chamber remains constant at a 0.31505 $m^3$/kg and while the Pump opens from 0 to 0.31505 $m^3$/kg. Initially, the combined volumes of the Working Chamber (upstroke) and Cooling Chamber equals 0.62913+0.31505=0.94418 $m^3$/kg. The rapid adiabatic expansion of the working fluid in the Working Chamber from 0.62913 to 0.94418 $m^3$/kg causes a temperature drop from 580.33° K to 442.42° K and then a further entropy drop of 25.312 kJ/kg-K to 23.986 kJ/kg-K as the injected fluid is cooling down to 289.81° K in the Cooling Chamber. The residual working fluid in the Working Chamber will be progressively cooled down to the isothermal curve line of 62° F. or 289.81° K as that fluid is pushed through the Cooling Chamber as the upstroke approaches point ④a.

An isothermal condition in the Cooling Chamber guarantees the lowest required anti-work and the condition in the Cooling Chamber will be isothermal. However, the condition in the Working Chamber, because its fluid is isolated will tend to be adiabatic compressed before that anti-work on the compressed fluid is progressively absorbed as it's dumped into the Cooling Chamber. Yet, although compression occurs in the Working Chamber, as the volume is encroached on and its fluid is cooled as it's dumped into the Cooling Chamber, its adiabatic impact will be diminished.

Likewise, an opposite adiabatic condition occurs in the Pump. Because the compressing fluid in the Pump is isolated from the isothermal conditions in the Cooling Chamber, its compression will begin with no adiabatic impact but will become increasingly adiabatic as the Pump fills. Note again that, during the upstroke, the pressure and temperature of the working fluid in Working Chamber will tend to rise adiabatically. However, as the working fluid is pushed through the Cooling Chamber and approaches point ④a, its heat energy will be absorbed, neutralizing the adiabatic effect and negative anti-work resistance. The opposite adiabatic build up occurs in the Pump.

During the upstroke, the relationship between these three chambers becomes a primary area of research. That relationship is defined by the relative of the volumes and the temperature/pressure conditions occurring in each volume. Interestingly, when the volume in the Working Chamber is accessed to the Cooling Chamber, a medium balance of pressures occurs. The temperature balance due to the adiabatic expansion will be 442.42° K. The temperature will drop further down to 289.81° K, causing a major drop in entropy and pressure in the Cooling Chamber. The precondition in the Cooling Chamber was at the lower pressure of 0.5287 MPa but is raised to a medium level of 0.97613 MPa while the pressure in the Working Chamber drops from 1.9240 MPa to the medium level of 0.97613 MPa and then drops down to the Cooling sink level of 0.63807 MPa.

In determining the efficiency of the engine in this embodiment, the thermal cycle and the mechanical losses required to achieve that thermal cycle should be considered. In considering the thermal cycle, it is noted that the downstroke is strictly adiabatic. However, during the upstroke, the condition is partially adiabatic and partially isothermal. Within the Cooling Chamber, since the volume is constant, the recompression process is considered to be isobaric. Considering the relative comparative volumetric sizes between the Working Chamber, Cooling Chamber and the progressively opening Pump Chamber, a kind of relative suction process also occurs.

As the sizable portion of the working fluid in the Working Chamber is released into the Cooling Chamber at BDC, actually expanding adiabatically to 289.15° K and seeking the medium pressure level of 0.97613 MPa, the working fluid in the Working Chamber is progressively being pushed into the Cooling Chamber and cooled. Although all the working fluid will be cooling as it passes through the Cooling Chamber approached TDC, the progressive cooling is an isothermal absorption. Therefore, a kind of suction work is also being caused during the upstroke.

The following is an analysis of the impact of the combined volume and pressure changes occurring in all three chambers, i.e., the expansion chamber 107 (Working Chamber), the second pump sub-chamber 112 (Pump Chamber) and the cooling exchanger 600 (Cooling Chamber) in the particular Example. The volume change in the combined three chambers in the Example is proportionally 2.50185 to 1. The volume change in the Working Chamber (not including the Expansion/Pump Chamber) is 0.19862−0.13225=0.06637 $m^3$/kg. A part of this volume change is caused by the anti-work of compression and another part is the positive work caused by suction.

Isothermal compression of 0.63807 (sink pressure) to 0.95758 is 0.31951 compression change Quasi-adiabatic compression 0.63807 (sink pressure) to 1.2545 is 0.61643 compression change Adiabatic compression 0.63807 (sink pressure) to 3.0555 is −2.4174 compression change Also, although there will be some adiabatic compression in the Working Chamber, since all the working fluid passes through the Cooling Chamber, the only significant adiabatic effect will occurs in the Pump Chamber after leaving the Cooling Chamber. The volume in the Pump Chamber opens from zero to 0.31408 $m^3$/kg throughout the entire upstroke while the volume in the Cooling Chamber remains at a constant 0.31408 $m^3$/kg. Therefore, the total adiabatic effect is expected to be only 25% with 75% isothermal effect. However, this may be altered by more rapidly opening the Pump during the earlier part of the upstroke.

The final temperature of the isolated working fluid in the Pump Chamber will determine the temperature level that must be reheated. Therefore, for points ④a and ①, Δu or $Q=u_{4a}-u_1$. This replenishment is the reheated input which is measured against the achievable work output. Therefore, eff. $\eta=W/Q=W_{total}/Q_{total}$. The temperature at points ④, ④a, and ④b is determined as follows:

$$T_{4b}=T_4+\Delta T_{adiabatic}$$

$$\Delta T_{adiabatic}=[(V_{progressive\ volume\ of\ Pump}/V_{cooling\ exchanger}+V_{cooling\ exchanger})\times p_{cooling\ chamber})]\div Constant$$

If the volume in the Pump is equal to the volume in the Cooling Exchanger, then $$V_{progressive\ volume\ of\ Pump}=\sim\!\!\tfrac{1}{2}\times V_{cooling\ exchanger}\text{ (the open volume of the Pump)}$$

Effective Adiabatic Volume=¼ of $V_{cooling\ exchanger}$

For a specific configuration of the Example $m=1$ kg $V1=V4=0.31505$ m³/kg $V2=V3=0.62913$ m³/kg $p1=6.1272$ Pa×10⁶

$p2=1.9240$ Pa×10⁶

$p3=0.33699$ Pa×10⁶

$p4$ (adiabatic)=3.0555 Pa×10⁶

$p4$ (quasi-adiabatic)=2.48975 Pa×10⁶

$p4$ (isothermal)=1.9240 Pa×10⁶

$T1=922.22°$ K (1200° F.)

$T2=580.33°$ K $T3=289.15°$ K (62° F.)

For Helium, the following calculations are obtained $\alpha=1.5$ $n=1.49$ $\alpha$ is the number of degrees of freedom divided by 2 (3/2 for monatomic gas, 5/2 for diatomic gas). For a monatomic ideal gas, $\gamma=5/3$, and for a diatomic gas (such as nitrogen and oxygen, the main components of air) $\gamma=7/5$ $$p=\text{constant}/V^\gamma,\ \text{constant}=pV^\gamma=6.1272\times 0.31505^{1.6655}=0.8949793$$

Note that, in FIG. 9, points ① and ② are at the same pressure level. This minimizes turbulence when access opens between the Working Chamber (upstroke) and the Cooling Chamber, maintaining the same pressure at point ④ (as at point ②) eliminates any negative work occurring during the compression phase of the cycle, i.e., during the upstroke, since the cooling process absorbs any build up of the negative pressure during the compression. The recompressed gas passes through the Cooling Chamber before entering the Pump Chamber.

The following are primary observations occurring during the cycle of Soony Engine of the Example.

The positive work output during the expansion downstroke of the engine of this embodiment between points ① and ② is adiabatic. The negative work input during the recompression phase or upstroke between points ②, ③ to ④a is divided between the adiabatic action in the Working Chamber (expansion chamber 107—upstroke) of the engine, the essentially isothermal action occurring in the Cooling Chamber (cooling exchanger 600), and the essentially adiabatic action occurring within the Pump Chamber (second pump subchamber 112). The volume in the Cooling Chamber is assumed to be equal to the volume in the Pump Chamber. Of course, the work or anti-work that occurs is acting on or against the Working Piston in the Working Chamber. When the upstroke begins, the higher pressure of the expanded working fluid in the Working Chamber (upstroke) is accessed to the lower pressure and temperature in the Cooling Chamber and the two strike a mutual lower pressure balance. At that point, the Pump Chamber is only beginning to open. There-

|  | Temperature (K) | Pressure (Mpa) | Density (kg/m³) | Volume (m³/kg) | Int. Energy (kJ/kg) | Enthalpy (kJ/kg) | Entropy (kJ/kg-K) | Cv (kJ/kg-K) | Cp (kJ-kg-K) | Cp/Cv |
|---|---|---|---|---|---|---|---|---|---|---|
| point 1 | 922.22 | 6.1272 | 3.1741 | 0.31505 | 2881.1 | 4811.4 | 25.312 | 3.1179 | 5.1899 | 1.6646 |
| point 2 | 580.33 | 1.9240 | 1.5895 | 0.62913 | 1814.2 | 3024.7 | 25.312 | 3.1171 | 5.1916 | 1.6655 |
| point 2a | 442.42 | .97613 | 1.0591 | 0.94418 | 1384.1 | 2305.8 | 25.312 | 3.1168 | 5.1922 | 1.6659 |
| point 3a | 289.15 | 0.63807 | 1.0591 | 0.94418 | 906.4 | 1508.9 | 23.986 | 3.1171 | 5.1926 | 1.6659 |
| point 3 | 289.15 | 0.95906 | 1.5895 | 0.62913 | 906.5 | 1509.9 | 23.140 | 3.1177 | 5.1924 | 1.6655 |
| point 4b adiabatic | 459.48 | 3.0555 | 3.1741 | 0.31505 | 1438.2 | 2400.8 | 23.140 | 3.1187 | 5.1904 | 1.6643 |
| point 4a quasi-adiabatic | 374.32 | 2.4915 | 3.1761 | 0.31485 | 1172.5 | 1957.0 | 22.499 | 3.1190 | 5.1909 | 1.6643 |
| point 4 | 289.15 | 1.9240 | 3.1741 | 0.31505 | 906.88 | 1513.0 | 21.695 | 3.1195 | 5.1918 | 1.6643 |
| Expand to end | 289.15 | 0.33699 | 0.56016 | 1.7852 | 906.28 | 1507.9 | 25.312 | 3.1165 | 5.1928 | 1.6662 |

$R$=Constant helium=2077 J/kg·K, where R is the universal gas constant and n is the number of moles in the system (a constant).

$\gamma=Cp/Cv=$ "+1/"=1.6655 (where $\gamma=1.6655$ value is taken from the above chart.)

$1.6655\alpha-\alpha=1$ $0.6655\alpha=1$ fore, the total volume being compressed is the combined volume in both the Working Chamber (upstroke) and Cooling Chamber, as the Pump Chamber begins to open. The play of pressures, temperatures, and entropy is determined by the interrelationship of these three volumes.

In the particular Example, during the upstroke, the Working Chamber volume will compress from 0.62913 m³/kg to zero (including the negative volume displacement occurring in the Expansion/Pump Chamber, while the volume in the Cooling Chamber remains constant at a 0.31505 m³/kg and while the Pump opens from 0 to 0.31505 m³/kg. Initially, the combined volumes of the Working Chamber (upstroke) and Cooling Chamber equals 0.62913+0.31505=0.94418 m³/kg. The rapid adiabatic expansion of the working fluid in the Working Chamber from 0.62913 to 0.94418 m³/kg causes a temperature drop from 580.33° K to 442.42° K and then a further entropy drop of 25.312 kJ/kg-K to 23.986 kJ/kg-K as the injected fluid is cooling down to 289.81° K in the Cooling Chamber. The residual working fluid in the Working Chamber will be progressively cooled down to the isothermal curve line of 62° F. or 289.81° K as that fluid is pushed through the Cooling Chamber as the upstroke approaches point ④a.

An isothermal condition in the Cooling Chamber guarantees the lowest required anti-work and the condition in the Cooling Chamber will be isothermal. However, the condition in the Working Chamber, because its fluid is isolated will tend to be adiabatic compressed before that anti-work on the compressed fluid is progressively absorbed as it's dumped into the Cooling Chamber. Yet, although compression occurs in the Working Chamber, as the volume is encroached on and its fluid is cooled as it's dumped into the Cooling Chamber, its adiabatic impact will be diminished.

Likewise, an opposite adiabatic condition occurs in the Pump. Because the compressing fluid in the Pump is isolated from the isothermal conditions in the Cooling Chamber, its compression will begin with no adiabatic impact but will become increasingly adiabatic as the Pump fills. Note again that, during the upstroke, the pressure and temperature of the working fluid in Working Chamber will tend to rise adiabatically. However, as the working fluid is pushed through the Cooling Chamber and approaches point ④a, its heat energy will be absorbed, neutralizing the adiabatic effect and negative anti-work resistance. The opposite adiabatic build up occurs in the Pump.

The medium pressure between the balance that occurs when combining the Working Chamber and Cooling Chamber also strikes an temperature balance of 442.42° K. In the Working Chamber this temperature/pressure tends to be the point of potential adiabatic compression. However, in the Cooling Chamber, the temperature was raised from 289.15° K to 442.42° K which will immediately be cooled down again, causing a further drop in entropy and pressure in the Cooling Chamber. The condition, therefore, in the Cooling Chamber will be rise from that lower pressure of 0.63807 Mpa. All the above is based on the assumed condition that points ② and ④ are at the same pressure level. However, if point ④ is at a higher pressure level than point ②, the expansion downstroke can be longer. At the BDC of the downstroke, then, when the compression phase begins, the lower pressure in the Working Chamber will need to rise to balance out the pressure at point ④ in the Cooling Chamber. Note here that the pressure in the Cooling Chamber had been raised to the higher pressure at point ④ and isolated during the previous upstroke, while the pressure in the Working Chamber (upstroke) is the end pressure after the expansion during the previous downstroke. The mean level (the balance pressure between the Cooling and Working (upstroke) Chambers) will be somewhere between the high of point ④ and the low of point ②, depending on the comparative volumes of the Cooling Chamber and the end volume of the Expansion Chamber before compression. However, this imbalance will cause some turbulence and, therefore, is likely undesirable. However, in the lower temperature range, expanding the Piston stroke as far as possible as compared to the Pump stroke may have its advantages.

In determining the efficiency of the engine, the recompression process during the upstroke should be considered. For simplicity, points ② and ④ are maintained at the same pressure level, thus eliminating any antiwork or turbulence during the upstroke as the working fluid is pressed into the Cooling Chamber. With balanced pressures, the only antiwork during the upstroke will be that caused on the working fluid that is being progressively compressed and isolated in the Pump Chamber. Any variation from an isothermal condition to an adiabatic condition will be a function of the relative volumetric comparative sizes between the Cooling Chamber and the progressively opening Pump Chamber. The final temperature of the isolated working fluid in the Pump Chamber will be the level that must be reheated. Therefore, $\Delta h$ or $Q=h_{4b}-h_1$. This is that level that must be reheated with input heat that will be required to achieve the work output. Therefore, eff. $\eta=W/Q=Wtotal/Qtotal$. The temperature at point ④b is determined as follows:

$$T_{4b}=T4+\Delta T$$

$$\Delta T=(V_{progressive\ volume\ of\ Pump}/V_{cooling\ exchanger} \times p_{cooling\ chamber})+\text{Constant}$$

if the volume in the Pump is equal to the volume in the Cooling Exchanger, then $$V_{progressive\ volume\ of\ Pump}=\sim\frac{1}{2}\times V_{cooling\ exchanger}\ \text{(the open volume of the Pump)}$$

Expansion Downstroke

Constant=894,979.3 pa

For point ① to point ②, $W_{adiabatic\ 1-2}$=1069.996 kJ/kg
Compression Upstroke—suction
1. Isothermal Upstroke (point ③ to point ④)—A condition that is occurring to the fluid as it is being progressively sucked into the Cooling Exchanger. Since points ② and ④ are at the same pressure, an isothermal work due to the suction occurs during the upstroke. However, that work is determined as follows:

$$T_2=\text{Constant}=62°\ F.=16+273.15=289.15°\ K$$

$$V_4=0.31505\ m3/kg$$

$$V_3=0.62913\ m3/kg$$

$$W_{isothermal\ 3-4}=-244.38\ kJ/kg\ \text{(Isothermal)}$$

The working fluid that is being actually compressed in the Working Chamber is progressively being cooled in the Cooling Chamber. Although all the working fluid will be cooling by TDC, the progressive cooling means that the isothermal absorption is progressive. Therefore, the suction work caused will be only impact on about half of the upstroke. Therefore, if 244.38 kJ/kg is the potential, about 122 kJ is the actual.

2. Adiabatic Upstroke (point ③ to point ④b)—The only adiabatic action during the upstroke occurs in the Pump Chamber and the Working Chamber. Since it is assumed that the Pump volume is equal to the volume in the Cooling Chamber and since the open Pump volume progressively opens from zero to the same as the Cooling Chamber, the antiwork of the adiabatic compression will be about 25% as compared to the 75% of the isothermal antiwork.

$$W_{3-4b\ adiabatic}=-280.81\ kJ/kg\ \text{(Adiabatic compression)}$$

3. Quasi-adiabatic upstroke (point ③ to point ④a)

$W_{quasi\text{-}adiabatic\ 3\text{-}4} = W_{3\text{-}4b\ adiabatic}/4 = -70.2$ kJ/kg, since the pump is a quarter of the volume.

$W = W_{adiabatic\ 1\text{-}2} + W_{isothermal\ 3\text{-}4} - W_{quasi\text{-}adiabatic\ 3\text{-}4} = 1070 + 122 - 70.2 = 1121.8$ kJ/kg (Quasi-Adiabatic)

$W = W_{adiabatic\ 1\text{-}2} + W_{isothermal\ 3\text{-}4} - W_{adiabatic\ 3\text{-}4} = 1070 + 122 - 280.81 = 911.19$ kJ/kg (Adiabatic)

Heat Input $C_v = 3.1165$ kJ@ K/kg $T_1 = 922.22°$ K $T_{4b} = 459.48°$ K $T_4 = 289.15°$ K The end temperature of a hypothetical, fully adiabatic compression inside the open Pump before pumping would be ~459.48° K. However, because the volume in the Pump, due to its progressive opening, is effectively about a quarter of the total recompressed volume, and therefore, the final temperature in the Pump will be approximately one quarter toward 459.48° K from 289.15° K, i.e., 331.74° K.

$Q_{quasi\text{-}adiabatic} = mCv(T_1 - T_{4a}) = 1,840.38$ kJ/kg $Q_{adiabatic} = mCv(T_1 - T_{4b}) = 1,442.13$ kJ/kg Efficiency Eff. $\eta = W/Q = W\text{total}/Q\text{total} = 1121.8/1,840.38 = 60.95\%$ for Quasi-adiabatic upstroke Eff. $\eta = W/Q = W\text{total}/Q\text{total} = 911.19/1442.9 = 63.24\%$ for Adiabatic upstroke Carnot eff. $\eta = (922.22 - 289.15)/922.22 = 68.65\%$ The Quasi-adiabatic efficiency of 60.95% is about 90% of the 68.5% Carnot efficiency. This is about a 20% improvement over the Stirling engines' 72% optimum isothermal efficiency.

Force Required to Address the Circulatory Pump Inertia/Weight

A feature of the present embodiment, other than the internal balanced pressure conditions occurring on both sides of pump piston 113, is the rapid closing action of the Pump at TDC. To insure rapid closing, the Pump Spring (e.g., biasing element 709) is cocked while the Pump is being opened in preparation for the release of the rapid Pump closing action. Since the Pump operates in a balanced internal pressure environment, the force vector of the Pump Spring is strong enough to completely close the Pump within the given time frame. The action is sufficiently fast and strong to overcome the mass weight of the pumping mechanism within the given time frame.

It should be noted that the opening of the Pump occurs during the entire compression stage (upstroke) of the engine, while the closing of the Pump occurs, as estimated, in a much shorter time, e.g., 1/10th of the rotation of the engine cycle at TDC. This means that the Pump moves from its completely open position to its completely closed position in ~1/10th of 1 RPM. If the engine has 3600 RPMs, as does the Kockums engine discussed herein, the closing rate of the Pump is estimated to be 3600 RPM×1/10th of 1 RPM=36,000 times the distance travel to close the Pump. The force of the closing of the pump is determined to be "F=ma," with "a" being the acceleration of the Pump during that closing time frame.

Assume the travel be $\Delta d = 0.333$ cm. With the volume of the Pump Chamber being 263.8 cm$^3$, with a 0.333 cm stroke, the area of the Pump Piston 113 will be 792 cm$^2$. Therefore, the radius of the Pump Piston will be r=15.88 cm. The distance (x) that the pump piston 113 travels in one second will be 0.333 cm/stroke×36,000 times/min×min/60 sec=1.998 m.

Speed t=1/3600 stroke/min×1/10×RPM×60 sec/min=1/600 sec (t is actually the shutter speed)

Acceleration $a = 2x/t^2 = 2398$ m/sec$^2$

If the weight (m) of the Pump mechanism is the equivalent of 0.3 kg, then $F = m \times a = 9.80665$ N, $P = W/\text{sec} = F \times d/\text{sec} = 7054$ N×0.00333 m/stroke×60 strokes/sec=23.49 N·m/sec The mean force acting on the Power Piston 103 by the working fluid will be the mean balance between the positive expansion force and the negative compression force during any given engine stroke.

$p_1 = 6.1272$ MPa is the TDC Expansion force $p_2 = 1.9240$ MPa is the BDC Expansion force $p_3 = 0.95906$ MPa is the BDC Compression force $p_{4a\ (quasi\text{-}adiabatic)} = 2.4500$ MPa is the TDC Compression force $\Delta p$ TDC $= p_1 - p_{4a} = 3.6772$ MPa is the Delta Expansion $\Delta p$ BDC $= p_2 - p_3 = 0.96494$ MPa is the Delta Compression $P_{Average} = \sim 3.6772$ MPa $- 0.96494$ MPa $= \sim 2.71226$ MPa is the Average Pressure Considering the curve on the graph of FIG. 9A, 2.6 MPa seems a more accurate average pressure.

$P_{backpressure} = \sim 1.5$ MPa is the Average Backpressure $P_{mean} = 2.6$ MPa $- 1.5$ MPa $= 1.1$ MPa is the Mean Pressure $A = \pi r^2 = (3.25)2(3.14) = 33.18$ cm$^2$ is the area of the pump piston 113.

$F = (P_{average} - P_{backpressure}) \times A = \sim 3650$ N $P = W/\text{sec} = \sim 3650$ N×0.0639 m/stroke×60 strokes/sec=13,994 N·m/sec Therefore, with the 23.49 J/sec drag of the Pump as compared to the mean force output of the Soony engine, which is 13,994 J/sec, the drag on the engine is 0.17%, as compared to the Stirling engines which suffer, at least, a ~28% loss. Note that the above calculations look at the comparative power relationship between the Power Piston 103 and the Pump Piston 113. It is, therefore, reasonable to assume that the cocking of the Pump Spring 709 (relative to the engine output) is reasonably negligible. Its Pump closing action will be deliberate and very efficient.

In the Example, the Pump and its mechanisms, including friction, is the equivalency of 0.3 kgm and the drag will be only 0.17% which is 0.17% off the 64.60% thermal efficiency, although the engine will suffer around a 20% loss in friction, heat losses, and breathing, with this projected 80% mechanical efficiency and drag of only 0.15%, the actual engine efficiency is projected to be (80%−0.15%)×64.6%=51.58% actual conversion of heat to physical work. In summary, the Soony engine in this Example provides around a 51.58% heat conversion to work output, which is comparable with turbines, but advantageously with the lower RPMs than turbines.

Physically Sizing a 25-kW Engine

The physical sizing of the Soony engine in this Example will be approximately 20% larger than the Stirling engine because the isothermal input of the Sterling engine improves the power work output of the engine by about 20% over the Soony engine in this Example. However, the 20% greater efficiency of the Soony engine in this Example far outweighs the loss of power work output.

Thus, roughly speaking, the engine in this Example will need to be ~20% larger than a Stirling engine to achieve the same power output. The cost of enlarging the engine in this Example by 20% is insignificant compared to the cost of fuel consumption or for solar collectors to account for the 20% efficiency loss.

Various embodiments will be further described herein below.

Figure 3:
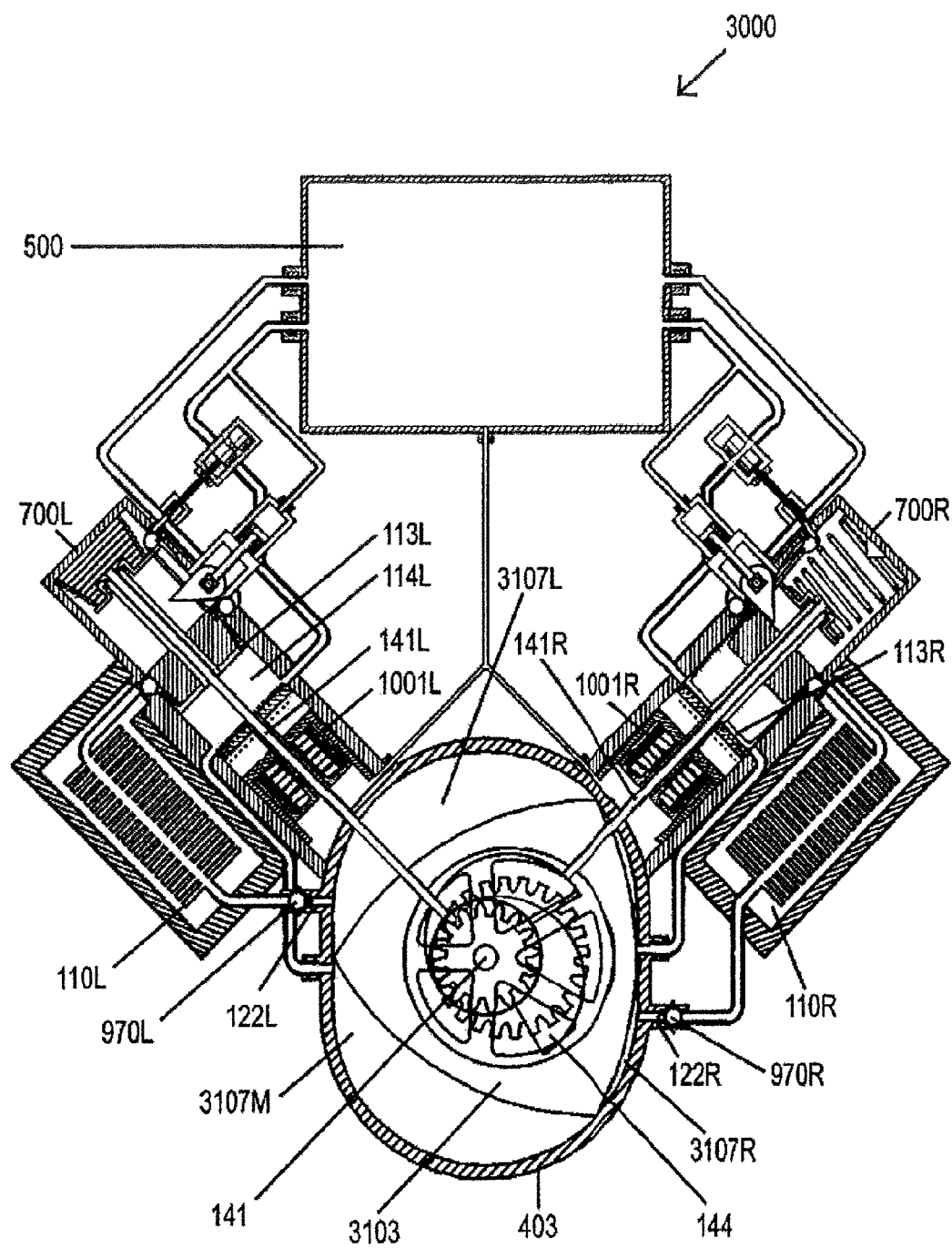
FIG. 3 is a simplified cross-sectional view of a thermal system in accordance with an embodiment.
Figure 4:
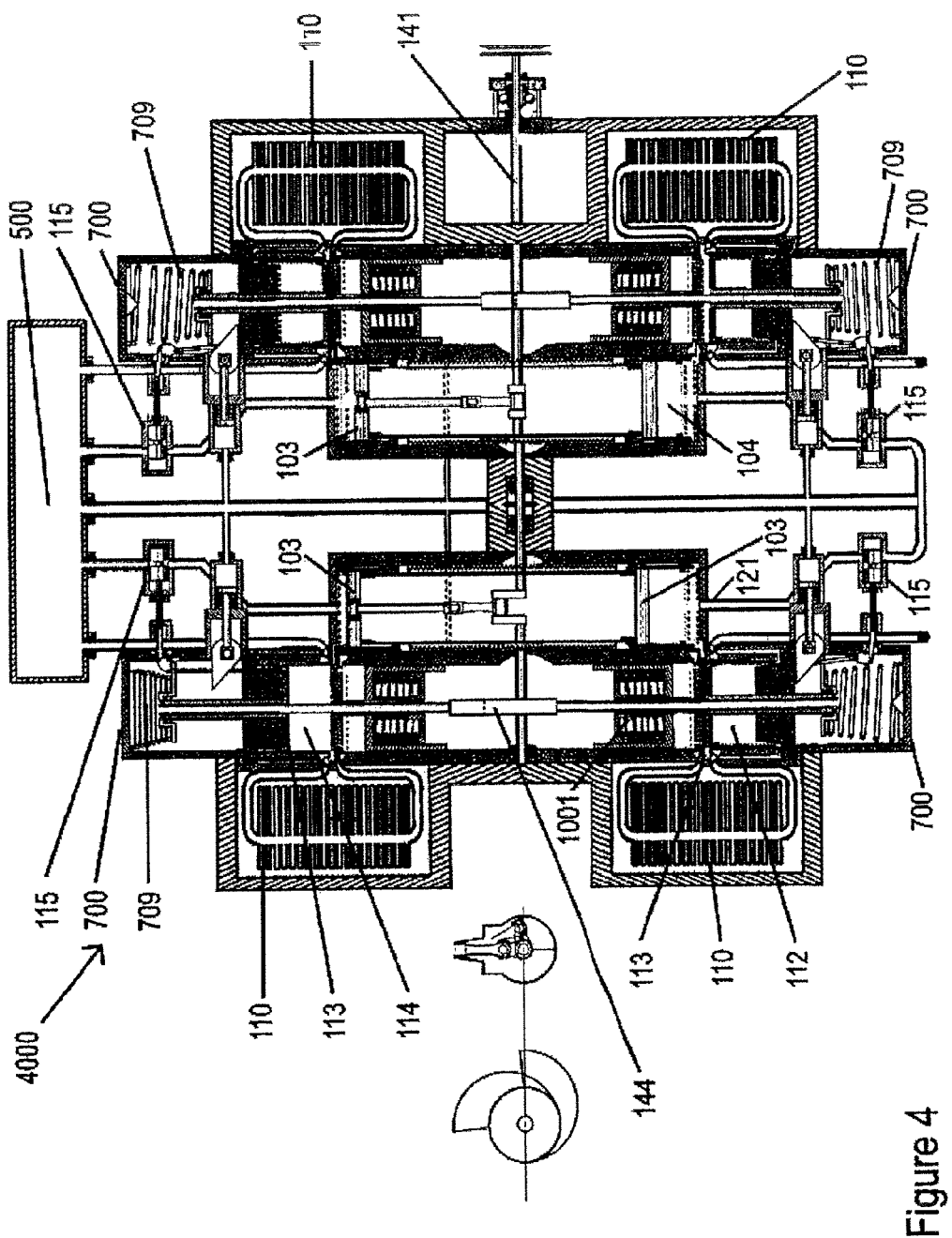
FIG. 4 is a simplified cross-sectional view of a thermal system in accordance with a further embodiment.

FIG. 3 is a simplified cross-sectional view of a thermal system or Soony engine 3000 in accordance with an embodiment that uses a Wankel rotary engine which allows for continuous centrifugal buildup of inertia for power output. FIG. 4 illustrates a similar configuration 4000, which is piston-operated rather than Wankel-based. Wankel configurations include but are not limited to those of Ramelli, the Otto von Guericke, the Pappenheim, the Watt, the Elijah Galloway, the Jones, the Alotham/Franchot, the Cooley, the Umpleby, the Wallinder/Skoog, the Sensaud/Lavaud, the Bernard Maillard, and recent George Yarr.

Soony engine 3000 comprises heating exchanger 500, at least one Wankel engine 403 corresponding to heat engine 400 of FIG. 1 and having a Wankel piston 3103 which corresponds to power piston 103, a fluid pump 700R/L for each working chamber of Wankel engine 403, and a cooling exchanger (not numbered) that comprises a cooling chamber 110 for each fluid pump 700. Each Wankel engine 403 comprises three working chambers 3107R/L/M sequentially corresponding to piston chamber 104 of FIG. 1. Wankel engine 403 also comprises two fluid pumps 700R/L each with a cooling chamber 110R/L in the cooling exchanger. A cam mechanism 144 (FIG. 3) comprises cams 144L/R (FIGS. 5A-5H) which respectively connect pump pistons 113L/R of fluid pumps 700L/R to main power piston shaft 141 (similar to FIG. 1) via left/right pump shafts 141L/R. In some embodiments, auxiliary cooling elements (not shown in all drawings) are provided within the fluid pumps 700L/R for further cooling the cooled and compressed working fluid in addition to the cooling effect of the cooling exchanger. In one or more embodiments auxiliary cooling elements comprise sets of tubing with some of the coolant diverted from the cooling exchanger.

The shown Wankel configuration greatly simplifies the valve arrangement and general design, thus significantly lowering the cost of production. Specifically, in some embodiments, the rotary configuration eliminates the need for the piston stroke valve arrangement. In some embodiments, the rotary action also automatically shifts an expansion chamber 107 to cooling expended chamber 100 and/or vice versa without an internal piston-actuated valve arrangement. The cam mechanism 144 in some embodiments eliminates the need for any other complex timing mechanism.

In some embodiments, a check valve 970R/L is placed in exhaust ports 122R/L between Wankel engine 403 and cooling chambers 110R/L. (A similar check valve is also provided in some embodiments for the piston-based configuration of FIG. 4). Check valve 970R/L is used to maintain the holding pressure level in cooling chamber 110R/L and second pump sub-chamber 112R/L, e.g., at ~373 psi as in the Example discussed above. If variable conditions regulators 1001R/L (described herein below) are provided in some embodiments, the holding pressure will vary. Variable conditions regulators 1001R/L are omitted in other embodiments. When the high pressure working fluid is released into expansion chamber 107R/L, the high pressure working fluid in expansion chamber 107R/L then expands and the pressure drops to its low level, expansion chamber 107R/L will automatically shift to cooling expended chamber 100R/L and its expended working fluid will begin to be recompressed up to, e.g., about halfway (e.g., 373 psi in the Example) between the original hot/maximum pressure (e.g., 480 psi in the Example) of heating exchanger 500 and the minimum pressure (e.g., 255 psi in the Example) of the expanded working fluid. Check valve 970R/L in cooling chamber 110R/L holds the compressed fluid therein at its near constant medium raised pressure, so as to stabilize the flow into second pump sub-chamber 112R/L of fluid pump 700R/L, and prevents excessive compression fluctuation of the fluid in the pump during the compression phase.

Accordingly, a simple check valve 970R/L in conjunction with the use of the Wankel rotary configuration (with its ability to automatically shift expansion chamber 107R/L into cooling expended chamber 100R/L) and/or a simple cam mechanism 144 (which eliminates other complexities in the timing mechanism) all greatly simplify the configuration of Soony engine 3000.

Various (eight as shown) steps in the operation of Soony engine 3000 will be described with reference to FIGS. 5A-5H in a manner similar to FIG. 2. The description focuses on the action of one rotary Wankel piston 3103 (FIG. 3), recognizing that the engine can have more, e.g., two, sequential rotary pistons 3103 acting in the same manner but angularly (e.g., 90°) apart during the rotation of power piston shaft 141.

Note that, like FIG. 1, expansion chamber 107R/L (best seen in FIG. 5B) includes two volumes of the respective rotary piston compartment 3107R/L/M and the pump displacement compartment 114R/L (when opened). Likewise, cooling expended chamber 100R/L (best seen in FIG. 5C) includes four volumes of the respective rotary piston compartment 3107R/L/M (compressor), pump displacement compartment 114R/L (when closing), cooling chamber 110R/L and second pump sub-chamber 112R/L.

Figure 5A:
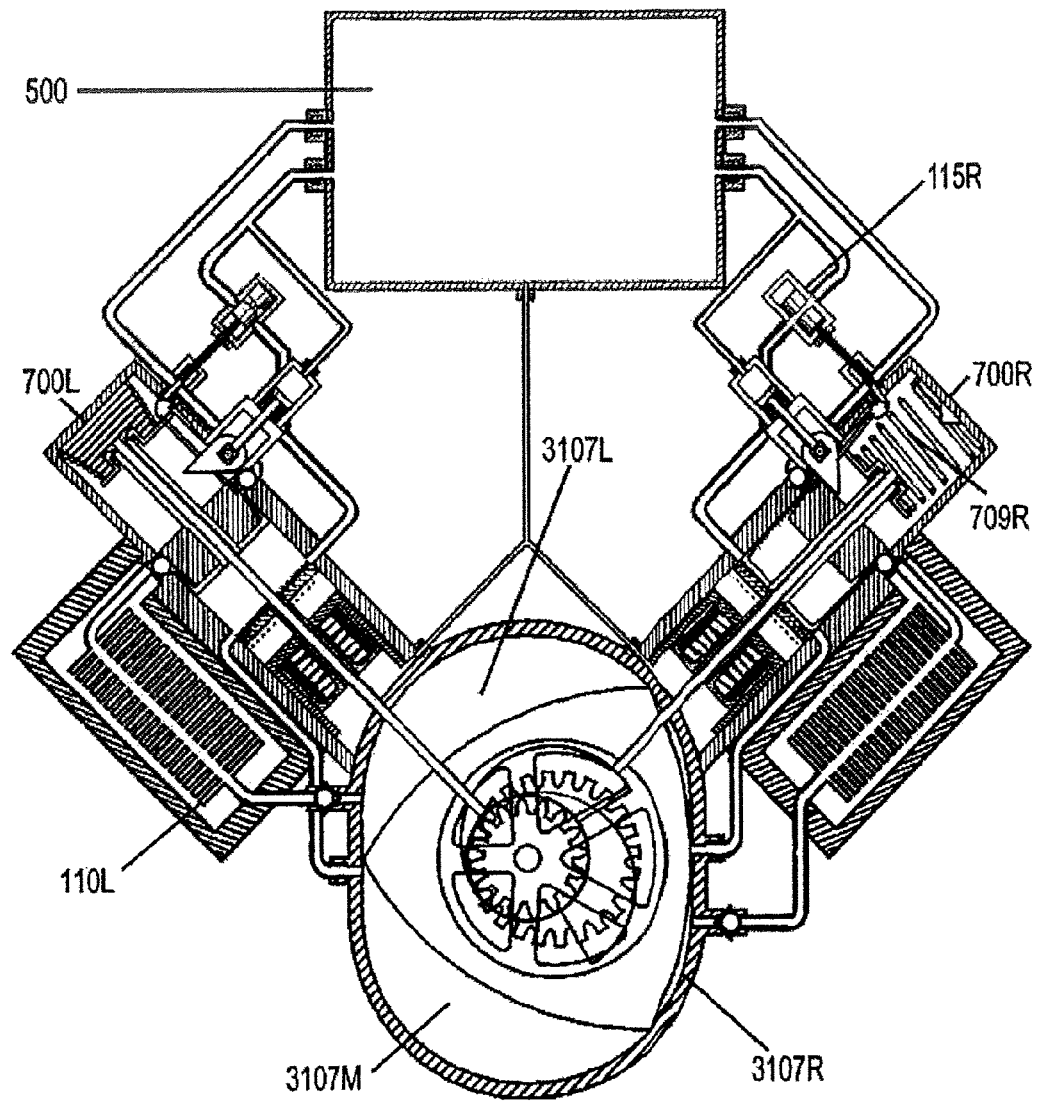
FIGS. 5A-5H include multiple views similar to FIG. 2 that illustrate numerous steps during one cycle of the system of FIG. 3.

Step 1—FIG. 5A

The right spool valve 115R is open and the right first pump sub-chamber 114R (operating now as an expansion chamber—best seen in FIG. 5B) is empty but accessed with the hot high pressure working fluid from heating exchanger 500 ready to be rapidly filled. The right second pump sub-chamber 112R of the right fluid pump 700R is completely filled with cooled, compressed working fluid ready to be pumped back into heating exchanger 500. The right working chamber 3107R is pressurized. The right biasing element 709R is fully cocked and ready to pump the cooled load from second pump sub-chamber 112R into the high pressure of heating exchanger 500. An balance of internal forces/pressures will allow the right fluid pump 700R to dump its load back into the high pressure/temperature heating exchanger 500. The right fluid pump 700R is in a state similar to Step 1 shown in FIG. 2.

The left working chamber 3107L in the rotary engine has completely expanded and is ready to convert its expanded volume to a compressing, cooling expended chamber on the right. The left fluid pump 700L (i.e., its second pump subchamber) is completely empty but ready to begin opening as the left working chamber 3107L of the rotary engine begins compressing the expended working fluid as it passes through cooling chamber 110L and, subsequently, second pump sub-chamber 112L (best seen in FIG. 5C) of the left fluid pump 700L. The left fluid pump 700L is in a state similar to Step 5 shown in FIG. 2.

Figure 5B:
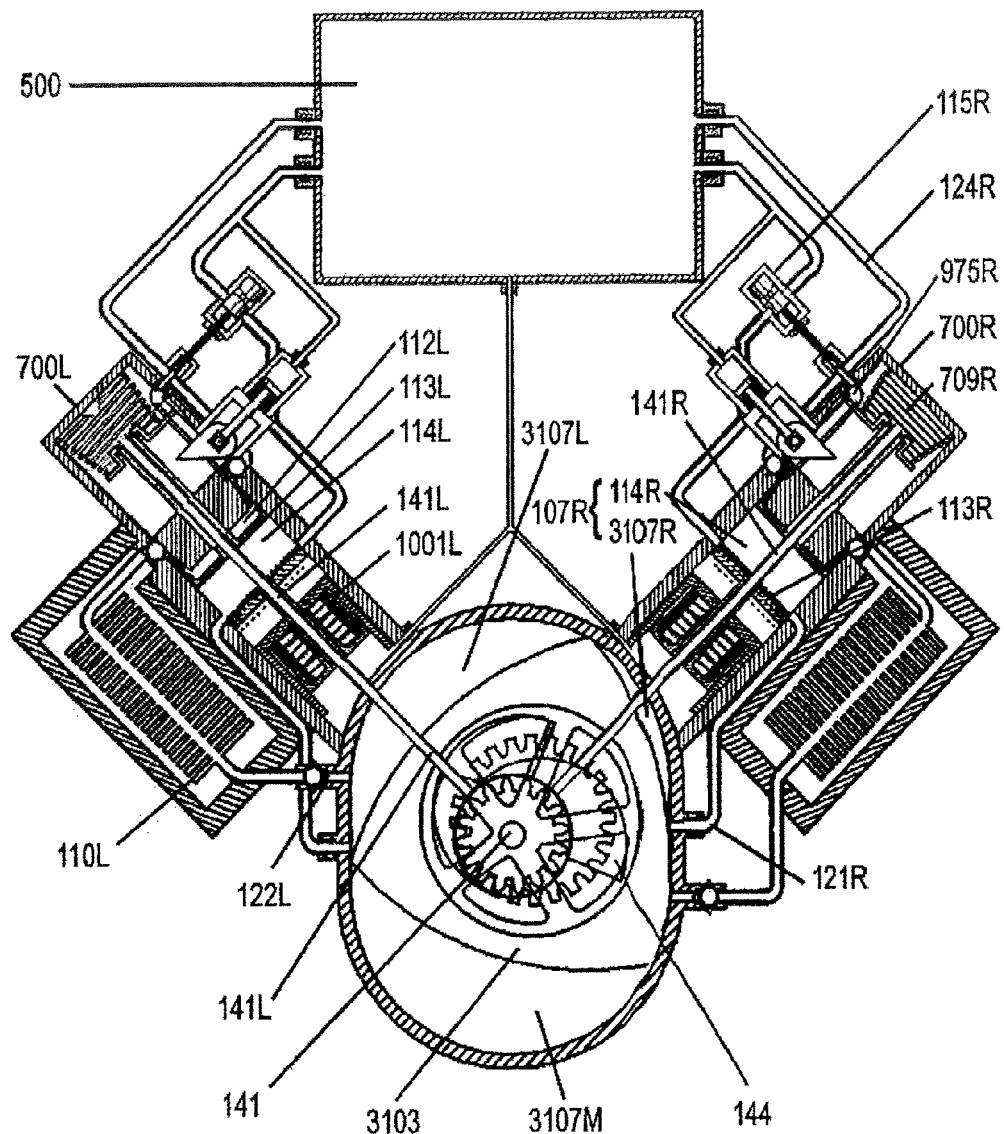

Step 2—FIG. 5B

As stated, during expansion, the expansion chamber, e.g., the right expansion chamber 107R, includes the right first pump sub-chamber 114R and the right working chamber 3107R. During compression, the cooling expended chamber, e.g., the left cooling expended chamber 100L (best seen in FIG. 5C) includes not only the left first pump sub-chamber 114L, and the left working chamber 3107L, but also left cooling chamber 110L and left second pump sub-chamber 112L in the opening left fluid pump 700L. In one or more embodiments, for optimum efficiency, all the expanded working fluid is forced out of the corresponding to piston compartment during compression and/or the volume of the piston chamber is closed off.

On the right side, the hot/high pressure working fluid from heating exchanger 500 has been injected via the right spool valve 115R (which functions similarly to inlet port 121 of FIG. 1) into the two-compartment volume of the right expansion chamber 107R, namely, right first pump sub-chamber 114R and right working chamber 3107R via right inlet port 121R which corresponds to connection 123 of FIG. 1. The rapid pumping action in the right fluid pump 700R has occurred to pump the load of right fluid pump 700R through right pump outlet port 124R back into heating exchanger 500. Right fluid pump 700R is completely empty and ready for the next opening of the pumping stroke. Specifically, due to the balanced pressure condition on opposite sides of right pump piston 113R, the right biasing element 709R, e.g., a compression spring, was able to force the right fluid pump 700R closed. The cam mechanism 144 had released its lock on the right pump shaft 141R, having allowed right fluid pump 700R to close. Likewise, Wankel piston 3103 is beginning its expansion stroke in the right working chamber 3107R (being fed from the right side). Right spool valve mechanism 975R pulls closed the right spool valve 115R when right fluid pump 700R is fully closed. The right fluid pump 700R is in a state similar to Step 2 shown in FIG. 2.

On the left side, the working fluid in the left expansion chamber 107L is completely expanded out. The left fluid pump 700L will begin to open in tandem with the Wankel piston 3103 as the injected working fluid in the right working chamber 3107R rotates the main drive shaft 141, forcing the compression of the expanded working fluid in the left cooling expended chamber 100L as that compressing working fluid is loaded into the left second pump sub-chamber 112L. The left cooling chamber 110L begins to extract heat as its volume pressurizes, lowering the entropy from the expanded working fluid in the left cooling expended chamber 100L. The right expansion chamber 107R will begin to move the Wankel piston 3103, causing a tandem action through left pump shaft 141L (acting on the cam 144 on the main drive shaft 141) that will begin to move the left pump piston 113L, thus drawing the expended working fluid out of the left working chamber 3107L, via left exhaust port 122L, through left cooling chamber 110L, into left second pump sub-chamber 112L. The left fluid pump 700L is in a state similar to Step 6 shown in FIG. 2.

Figure 5C:
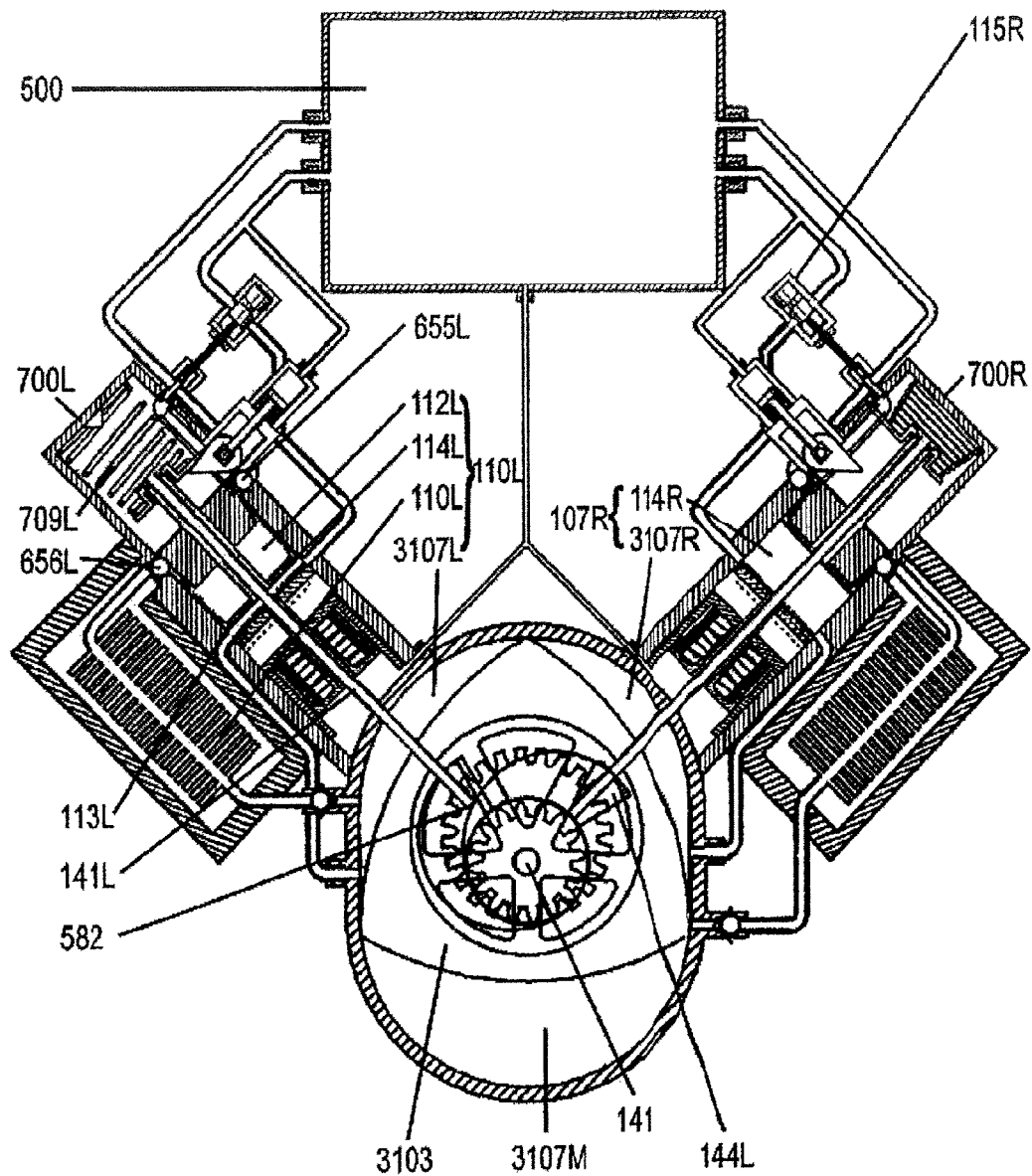

Step 3—FIG. 5C

The volume of the right expansion chamber 107R continues to open while the right spool valve 115R remains closed, allowing the working fluid in the right expansion chamber 107R (which includes the volumes of right first pump sub-chamber 114R and right working chamber 3107R) to expand adiabatically. The right fluid pump 700R is in a state similar to Step 3 shown in FIG. 2.

As the working fluid continues to expand on the right, the cool expended working fluid in the left cooling expended chamber 100L continues to be pumped through the left cooling chamber 110L into the left fluid pump 700L. The encroachment of the Wankel piston 3103 into left working chamber 3107L and the encroachment of the left pump piston 113L into the left first pump sub-chamber 114L (now operating as a pump displacement compartment) of the left cooling expended chamber 100L causes the compression. The cooling occurs in the left cooling chamber 110L lowers the entropy of the pressurized volume to accommodate the volume displacement of the left fluid pump 700L and closing of the left working chamber 3107L by Wankel piston 3103. The left pump check valves 655L and 656L hold the pumped working fluid in check throughout the pumping process.

The left biasing element 709L is being cocked via the contact 582 between left pump shaft 141L and the corresponding cam 144L of cam mechanism 144. As cam mechanism 144 rotates counterclockwise, contact 582 will move radially further away from power piston shaft 141, causing left pump shaft 141L to move to the upper left side corner of the drawing and cocking left biasing element 709L, which in this particular embodiment is a compression spring. The left fluid pump 700L is in a state similar to Step 7 shown in FIG. 2.

Figure 5D:
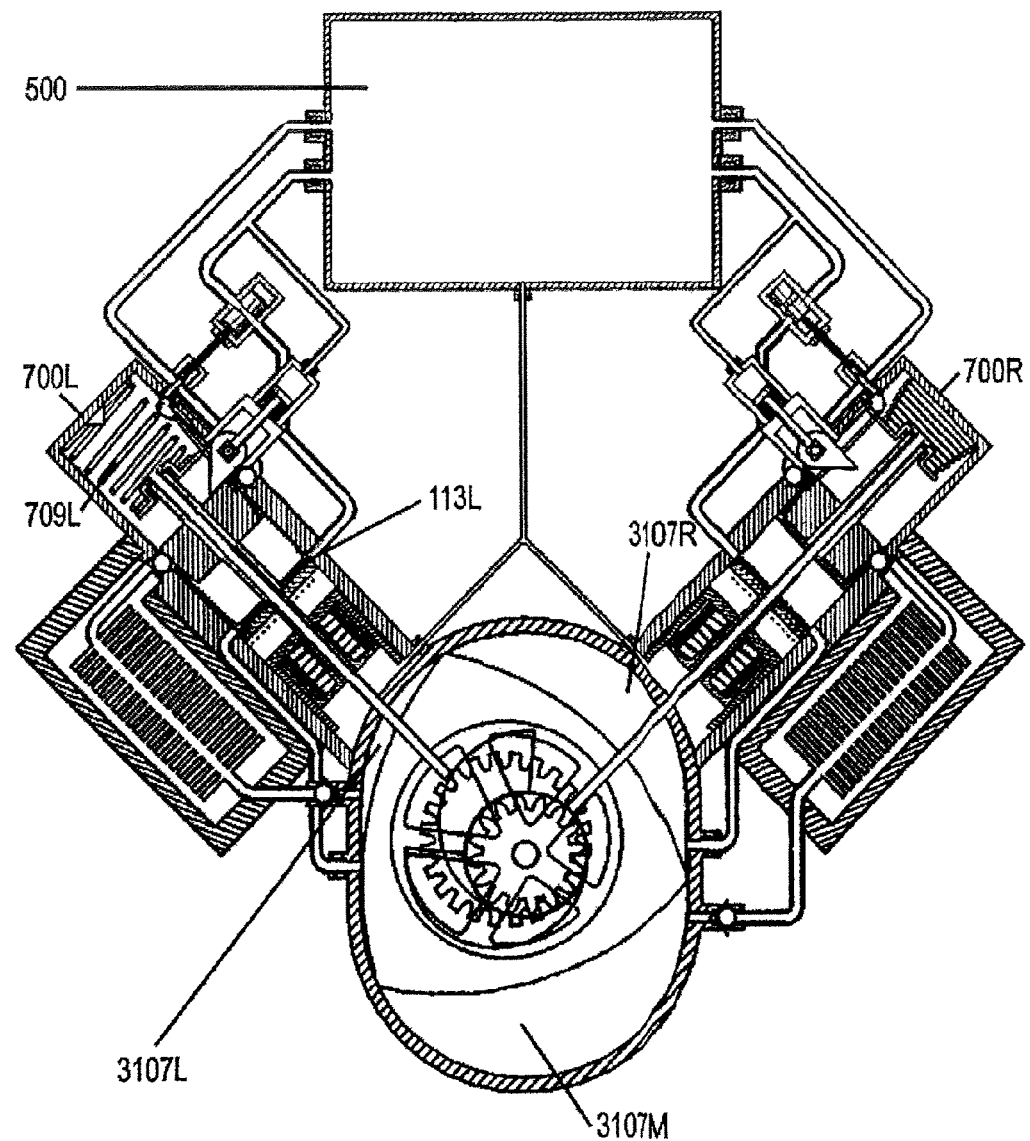

Step 4—FIG. 5D

The working fluid in the right expansion chamber 107R continues to expand, while the cooling expended fluid in the left cooling expended chamber 100L continues to shrink due to the loss of entropy and the compression as that fluid is pumped into the opening left fluid pump 700L. The left biasing element 709L is close to being fully cocked as the left fluid pump 700L opens. The pressures on both sides of the left pump piston 113L are equalized.

The right fluid pump 700R is in a state similar to Step 4 shown in FIG. 2. The left fluid pump 700L is in a state similar to Step 8 shown in FIG. 2.

Figure 5E:
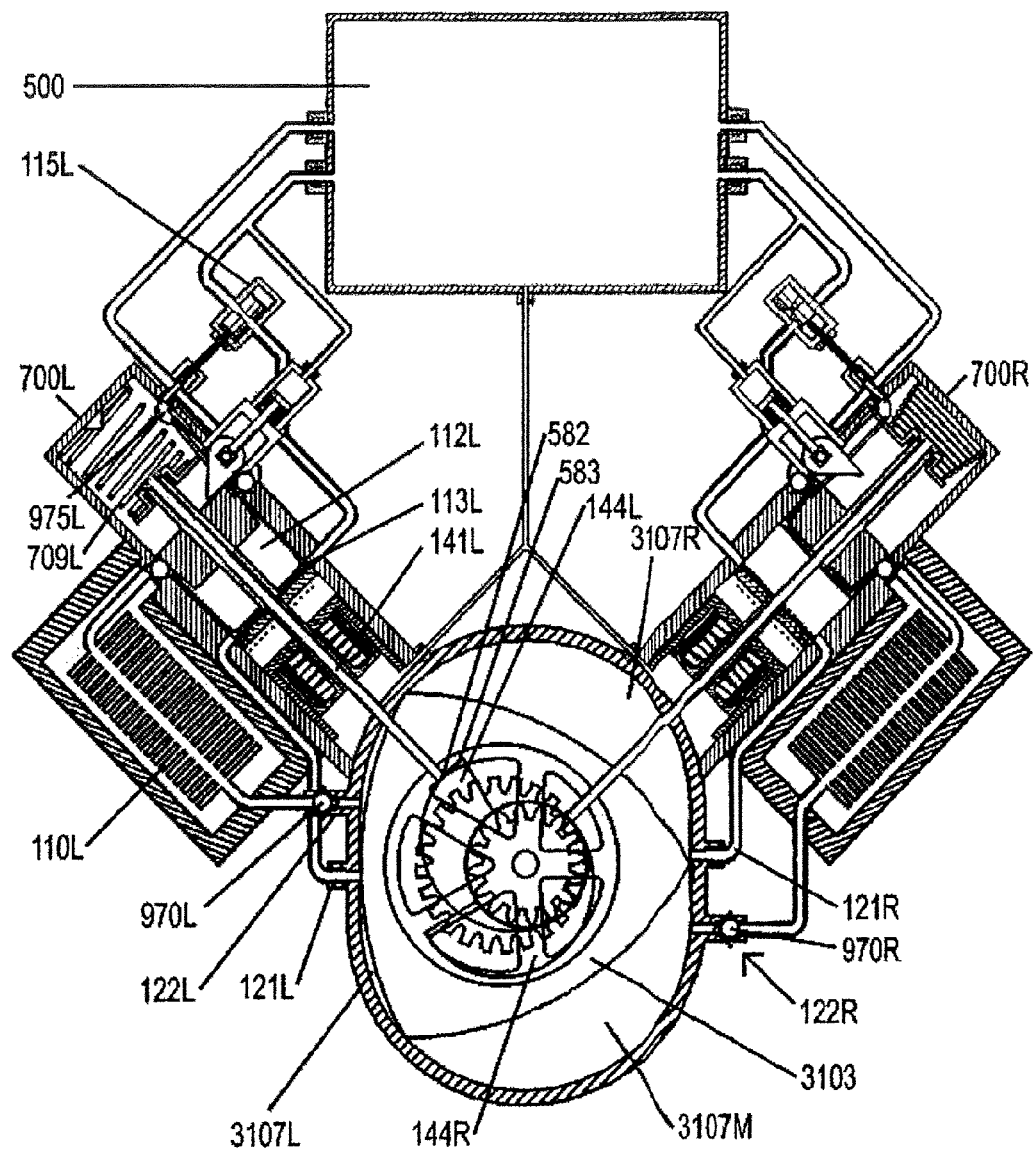

Step 5—FIG. 5E

The right side of Wankel piston 3103 has completed its downstroke. The right inlet port 121R of right working chamber 3107R is about to close by Wankel piston 3103, but the left exhaust port 122L is not yet open to release the expended working fluid in right working chamber 3107R to cooling expended chamber 100L, including the left cooling chamber 110L and left second pump sub-chamber 112L of left fluid pump 700L. The right exhaust port 122R is now open (through the opening of right check valve 970R) to the right cooling expended chamber 100R. The right check valve 970R isolates the pressurized volume in the cooling expended chamber 100R, thereby stabilizing the flow to the right fluid pump 700R.

The right fluid pump 700R is in a state similar to Step 5 shown in FIG. 2, or the state of left fluid pump 700L in FIG. 5A.

The left spool valve 115L to the left expansion chamber 107L is open. As a result, the left inlet port 121L to left working chamber 3107L is open and its volume is beginning to expand as Wankel piston 3103 begins its power downstroke for the left side of the Soony engine 3000. The working fluid from the heating exchanger 500 being injected into the left expansion chamber 107L also equalizes the pressure in the left fluid pump 700L allowing (in the next step) the left fluid pump 700L to close with the force of the left biasing element 709L, e.g., a compression spring. Meanwhile, the left biasing element 709L is almost fully cocked with the contact 582 between left pump shaft 141L and the corresponding cam of cam mechanism 144 approaching end point 583 of its cocking travel. When contact 582 passes end point 583, left pump shaft 141L and left pump piston 113L are released from the driving force of Wankel piston 3103, allowing left biasing element 709L to rapidly close left fluid pump 700L.

The left second pump sub-chamber 112L of left fluid pump 700L, which is filled with its load, is ready to dump that load back into heating exchanger 500. (In the next step, the same action through the left spool valve mechanism 975L will close the left spool valve 115L between heating exchanger 500 and the left expansion chamber 107L, isolating the expansion of the working downstroke of the left side of Soony engine 3000). The left inlet port 121L (corresponding to connection 123 of FIG. 1) will remain open during its respective power downstroke so that the working fluid can expand the combined volume of the left first pump sub-chamber 114L and left working chamber 3107L which together define left expansion chamber 107L.

The left fluid pump 700L is in a state similar to Step 1 shown in FIG. 2, or the state of right fluid pump 700R in FIG. 5A.

Figure 5F:
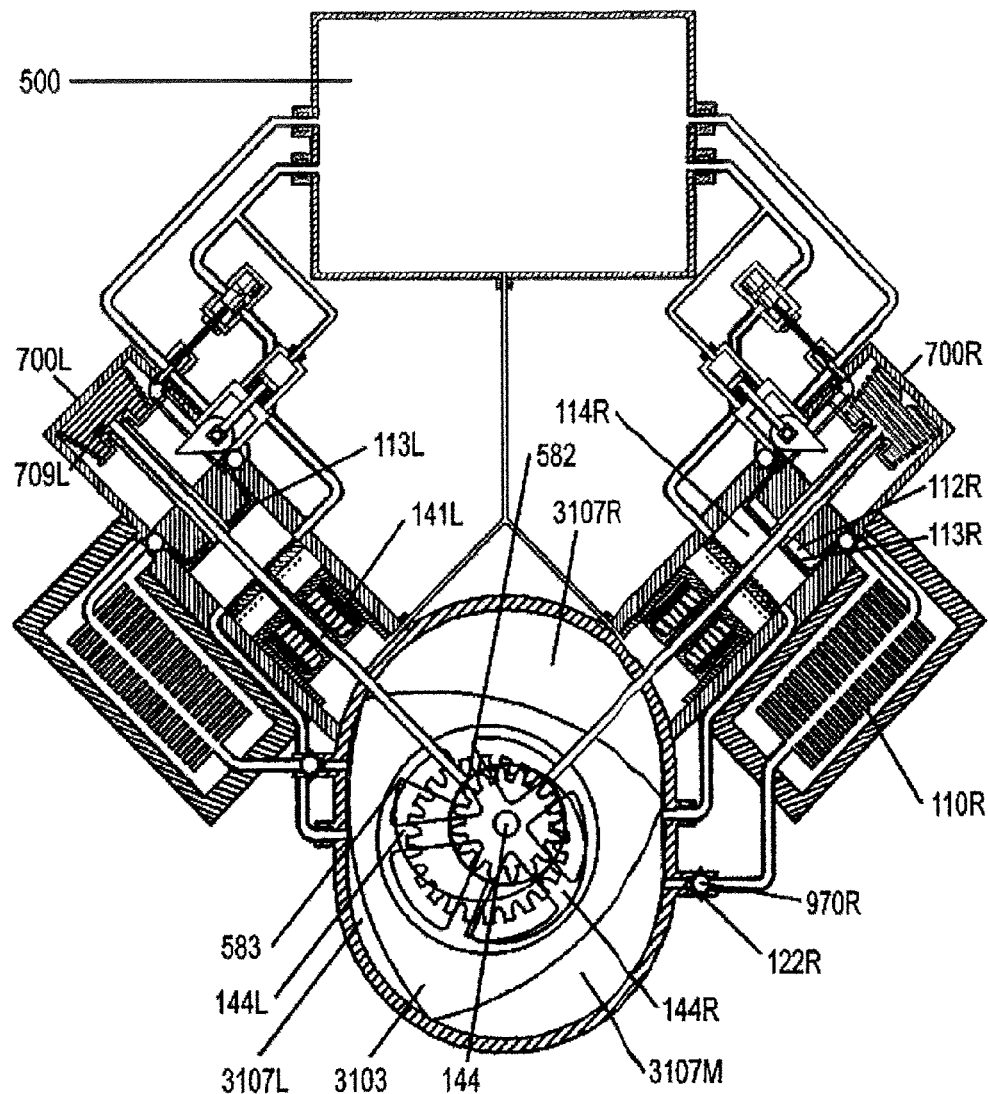

Step 6—FIG. 5F

Contact 582 has passed end point 583, releasing left pump shaft 141L and left pump piston 113L from the driving force of Wankel piston 3103 and allowing left biasing element 709L to rapidly close left fluid pump 700L. Contact 582 is now on a circular path around power piston shaft 141, rotational movement of which does not move left pump shaft 141L radially and hence frees left pump piston 113L from driving forces of Wankel piston 3103 until contact 582 again gets on the respective cam 144L. In an alternative embodiment, a stop (not shown) is provided so that left pump shaft 141L does not contact Wankel piston 3103 when it is not necessary for Wankel piston 3103 to drive left pump piston 113L for opening left second pump sub-chamber 112L of left fluid pump 700L and for, at the same time, cocking left biasing element 709L.

Once the left fluid pump 700L has dumped its load into the heating exchanger 500. The working fluid in left expansion chamber 107L continues to expand, moving Wankel piston 3103. The right check valve 970R in right exhaust port 122R remains open, assessing the now expended working fluid in middle working chamber 3107M and the right first pump sub-chamber 114R (now functioning as a pump displacement compartment) through right cooling chamber 110R into right second pump sub-chamber 112R. The chambers/sub-chambers 3107M, 114R, 110R and 112R together define right cooling expended chamber 100R.

The right fluid pump 700R is in a state similar to Step 6 shown in FIG. 2, or the state of left fluid pump 700L in FIG. 5B. The left fluid pump 700L is in a state similar to Step 2 shown in FIG. 2, or the state of right fluid pump 700R in FIG. 5B.

Figure 5G:
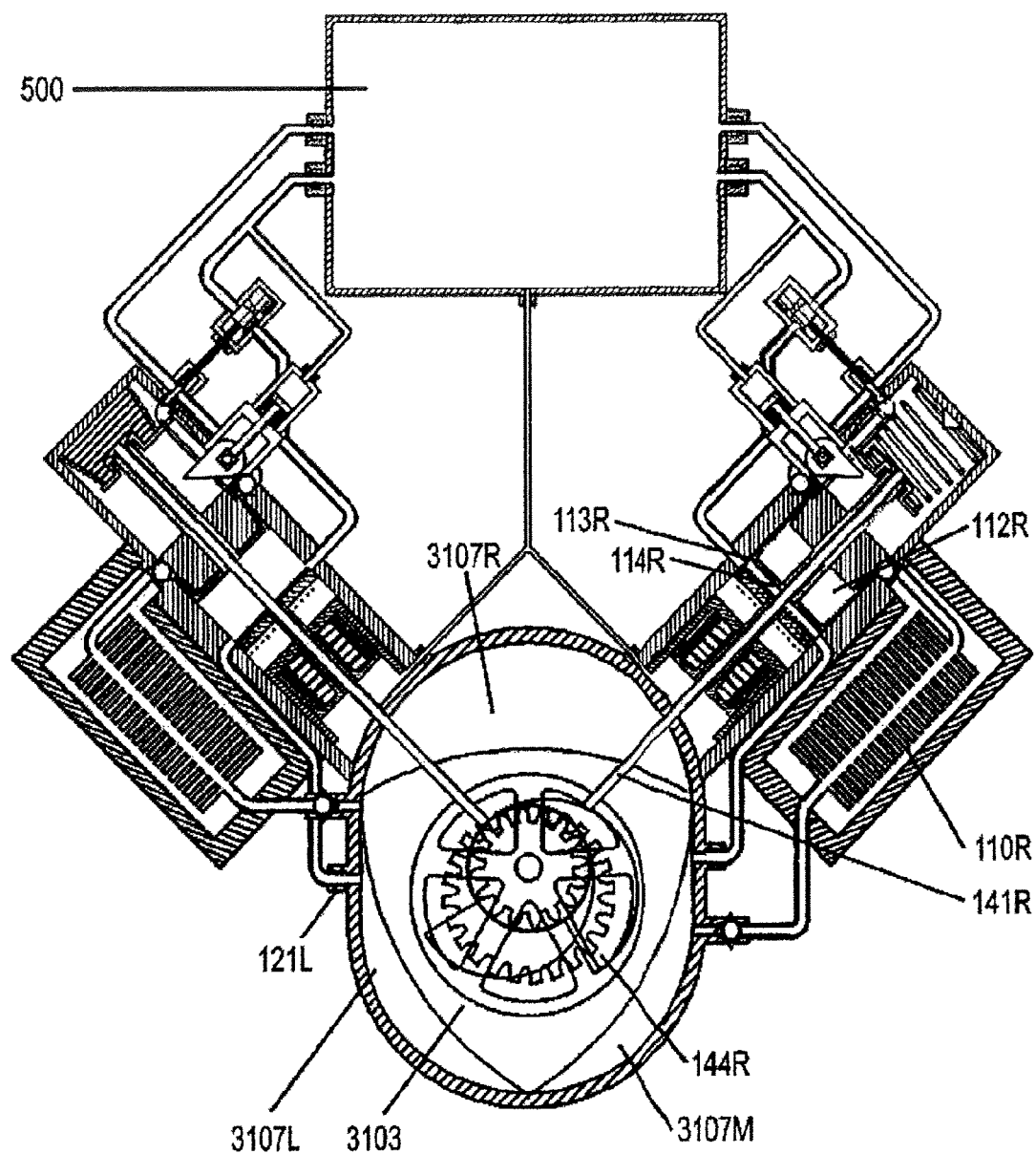

Step 7—FIG. 5G

The right second pump sub-chamber 112R of right cooling expended chamber 100R continues to open in tandem with the thrust of the cam 144R acting on right pump shaft 141R of right fluid pump 700R. The left inlet port 121L continues to be open, as the working fluid during the adiabatic expansion in left working chamber 3107L continues to exert work output.

The right fluid pump 700R is in a state similar to Step 7 shown in FIG. 2, or the state of left fluid pump 700L in FIG. 5C. The left fluid pump 700L is in a state similar to Step 3 shown in FIG. 2, or the state of right fluid pump 700R in FIG. 5C.

Figure 5H:
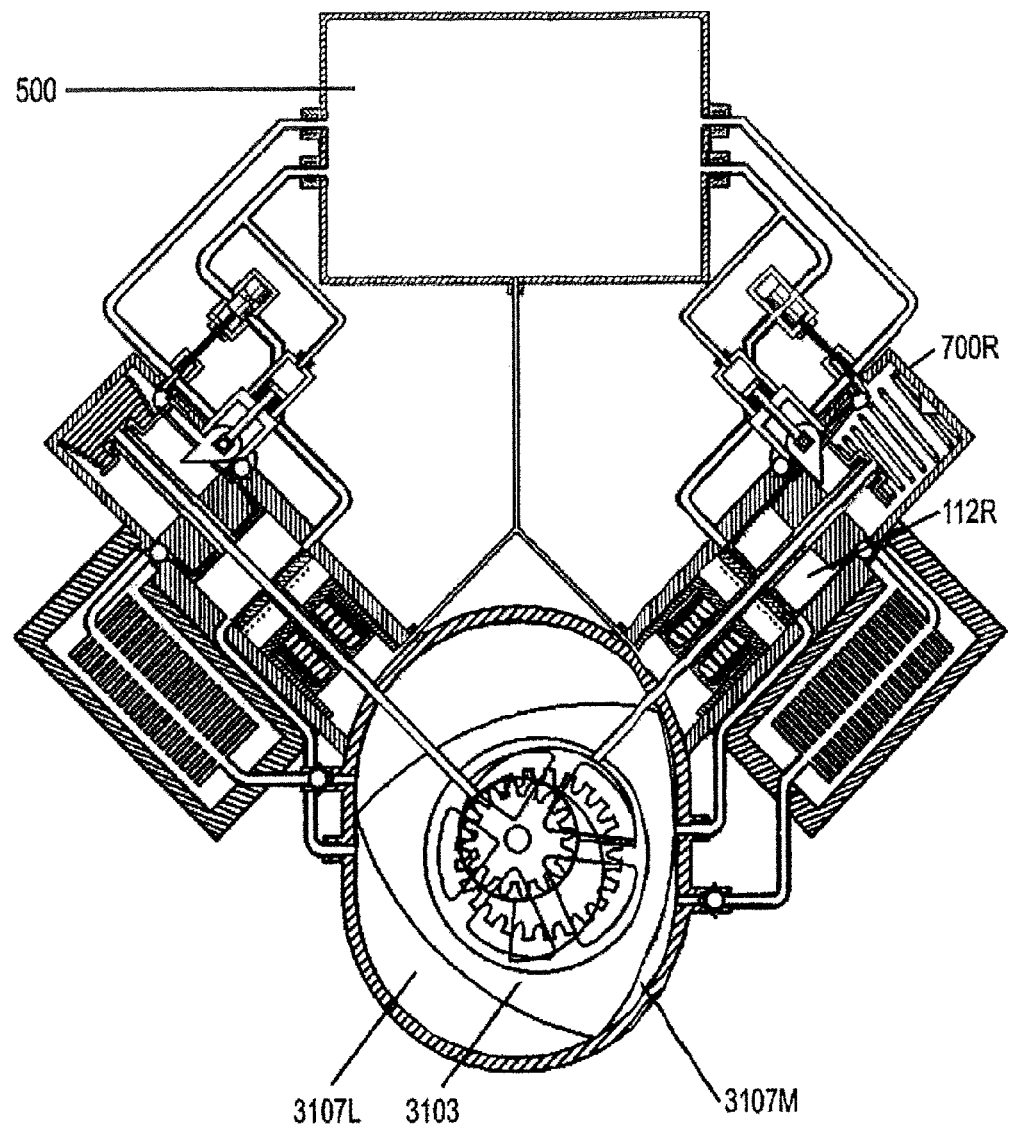

Step 8—FIG. 5H

The Wankel piston 3103 is nearing completion of its power downstroke in left working chamber 3107L. The right second pump sub-chamber 112R of right fluid pump 700R is nearly full and is approaching being ready to dump its load into the heating exchanger 500. The Soony engine 3000 is preparing to return to Step 1.

The right fluid pump 700R is in a state similar to Step 8 shown in FIG. 2, or the state of left fluid pump 700L in FIG. 5D. The left fluid pump 700L is in a state similar to Step 4 shown in FIG. 2, or the state of right fluid pump 700R in FIG. 5D.

In summary, the high pressure/temperature working fluid fed from heating exchanger 500 into the right side of the Soony engine 3000 in FIG. 3 is expanded into the upper side of the Wankel engine 403, then compressed/cooled into the left side, and finally pumped from the left side back into heating exchanger 500. Likewise, the high pressure/temperature working fluid fed from heating exchanger 500 into the left side of the Soony engine 3000 in FIG. 3 is expanded into the lower side of the Wankel engine 403, then compressed/cooled into the right side, and finally pumped from the right side back into heating exchanger 500.

Soony engine 4000 shows in FIG. 4 operates in a manner similar to Soony engine 3000. Soony engine 4000 comprises four heat engines 400 of FIG. 1 arranged at 90° with respect to each other. The heat engines 400 in Soony engine 4000 in the illustrated embodiment are operated individually of each other, except for the common power piston shaft 141. In further embodiments, heat engines 400 in Soony engine 4000 operate in tandem like in FIG. 3, i.e., in the left/right half of Soony engine 4000, the high temperature/pressure from heating exchanger 500 is expanded in the upper heat engine, then compressed/cooled into the lower pump for being pumped from the lower pump back into heating exchanger and vice versa.

The valve/port mechanism of Soony engine 4000 is, in some embodiments, different in some aspect from that of FIG. 3. FIG. 6 shows a valve/port mechanism of Soony engine 4000 in accordance with one or more embodiments. Only one cylinder (out of four) in FIG. 4 is shown in enlarged views in FIG. 6 which illustrates the cylinders in different steps corresponding (left to right on the top and left to right on the bottom) to Steps 8, 2, 4 and 5 of FIGS. 5H, 5B, 5E, and 5D, respectively. In particular, piston chamber 104 has two openings inlet port 121 and exhaust port 122. These ports are two rings of holes in two separate planes at or near TDC. In the operation, these two rings of holes are exposed or covered up by a movable ring valve sleeve 132 which is operated by a slidable cylinder sleeve, port valve bracket 133. The port valve bracket 133 allows for the travel of power piston 103 from TDC to BDC before the ring valve sleeve 132 shifts to either the opening or closing of one of the two ports, i.e., inlet port 121, exhaust port 122.

The top two drawings in FIG. 6 (Step 8 and Step 2) show the opening of inlet port 121 and the closing of exhaust port 122. Specifically, at or near TDC, power piston 103 engages port valve bracket 133 from below and moves port valve bracket 133 together with ring valve sleeve 132 upwardly, thereby opening inlet port 121 and closing exhaust port 122. As soon as power piston 103 leaves the vicinity of TDC, port valve bracket 133 returns to its neutral position, allowing ring valve sleeve 132 to close both inlet port 121 and exhaust port 122. Therefore, inlet port 121 is opened only briefly at or near TDC and both ports are closed during the downstroke or expansion of the working fluid.

The bottom two drawings in FIG. 6 (Step 4 and Step 5) show the closing of inlet port 121 and the opening of exhaust port 122. Specifically, at or near BDC, power piston 103 engages port valve bracket 133 from above and moves port valve bracket 133 together with ring valve sleeve 132 downwardly, thereby opening exhaust port 122 while maintaining inlet port 121 in the closed state. As power piston 103 leaves BDC and moves upwardly, port valve bracket 133 remains in the downward position, allowing ring valve sleeve 132 to continue to open exhaust port 122 and close inlet port 121. Therefore, inlet port 121 is closed most of the downstroke and the upstroke, while exhaust port 122 is opened during most of the upstroke.

Various embodiments are derivable from the configurations discussed above and/or herein below. For example, one or more than one cams 144R/L is/are provided on each power piston shaft 141 in accordance with in one or more embodiments. Other forms of connectors 800 and/or cam mechanism 144 are not excluded. The number of heat engines or power cylinders/chambers in each Soony Engine is variable depending on applications and/or other design considerations. Biasing element 709 is, in some embodiments, cocked by external forces other than from power piston shaft 141 which in other embodiments directly or indirectly drives pump piston 113 to cock biasing element 709.

FIG. 7 discloses another configuration in which the configuration disclosed in FIG. 3 is further modified to additionally include at least a lever 739 for reversing the cocking and pumping action of biasing element 709. Other arrangements are, however, not excluded. The configuration disclosed in FIG. 7 is simplified compared to that of FIG. 3, and also show a much tighter relationship between the Wankel piston 3103, first pump sub-chamber 114R/L, and second pump sub-chamber 112R/L.

Figure 8A:
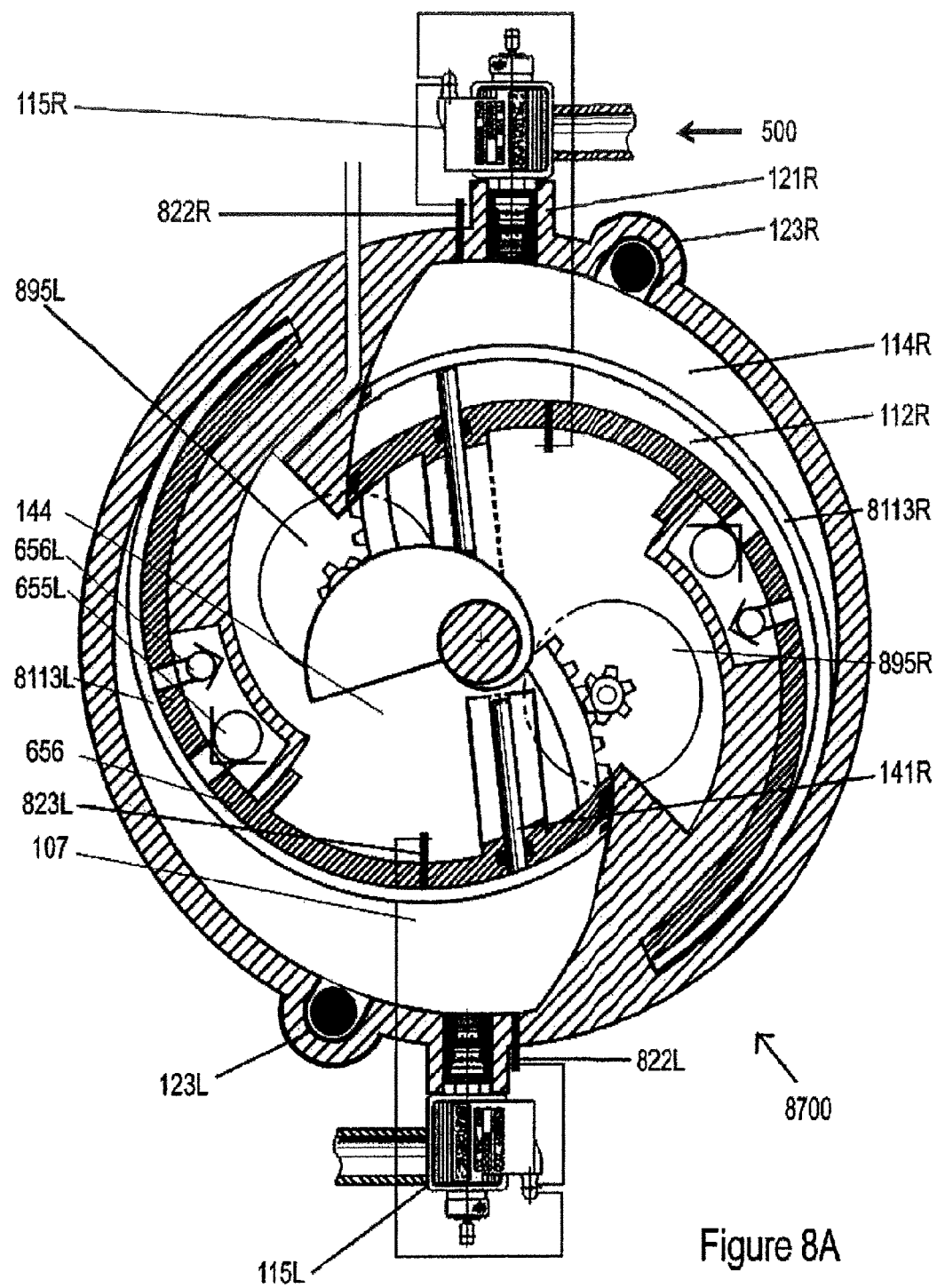

FIG. 8A discloses a further embodiment in which a modified fluid pump 8700 is schematically illustrated. In this embodiment, the pump piston 113 and biasing element 709 are combined into a single element, designated at 8113R/L. The pump piston/biasing element 8113R/L is an elastic membrane or diaphragm or partition which is moveable between two positions, one of which is an initial position, the other being a biased position. Pump piston/biasing element 8113R/L is forced into the biased position directly or indirectly by power piston shaft 141, e.g., through pump shaft 141R/L and cam 144. A single cam 144 is used in the embodiment specifically illustrated in FIG. 8A. However, more than one cams are used in other embodiments similar to the manner discussed with respect to FIG. 3. Gyrating stabilizers 895R/L are included in some embodiments to prevent pump piston/biasing elements 8113R/L from fluctuating during the varying pressure conditions as previously disclosed. The inlet valves 115R/L from heating exchanger 500 are, in one or more embodiments, solenoid valves that are switched open and closed by respective contacts, e.g., 822R/L, 823R/L on the wall of the chamber of fluid pump 700R/L, with pump piston/biasing element 8113R/L.

In the upstroke (similar to Steps 5-8 in FIG. 2) of the right side of the configuration disclosed in FIG. 8A, cam 144 moves pump piston/biasing element 8113R, via right pump shaft 141R, from a rest or initial position one a wall of the right second pump sub-chamber 112R toward the opposite wall. The rotation of cam 144 progressively forces pump piston/biasing element 8113R away from power piston shaft 141 against elasticity of pump piston/biasing element 8113R. The expanded working fluid in right first pump sub-chamber 114R is compressed out to be cooled in cooling chamber 110R (not shown). When pump piston/biasing element 8113R comes in contact with contact 822R, solenoid valves 115R is turned on (opened) allowing access of the high temperature/pressure working fluid into right first pump sub-chamber 114R, equalizing pressures on opposite sides of pump piston/biasing element 8113R. Then, or at the same time, the cocking action of cam 144 is over (similar to FIG. 5F) and pump piston/biasing element 8113R is allowed to spring back to its initial position, unloading the cooled and compressed working fluid from right second pump sub-chamber 112R into the cooling exchanger (not shown). As pump piston/biasing element 8113R touches contact 832R, solenoid valves 115R is turned off (closed), and the expansion (downstroke) period begins.

The pump piston/biasing element 8113L on the left side operates in a similar manner.

FIG. 8B discloses an alternative configuration 8900 in accordance with a further embodiment. Unlike the configuration illustrated FIG. 8A where the pump piston/biasing element is movable within a pump chamber of fluid pump 8700, pump piston 8113R/L in FIG. 8B is stationary whereas the pump chamber 8708R/L of the fluid pump is moveable by cam 144. A biasing element 8709R/L, e.g., a leaf spring, is provided to bias pump chamber 8708R/L against cam 144 or toward power piston shaft 141. Other biasing elements, such as air cylinders, are not excluded. Pump chamber 8708R/L comes in and out of contact with contacts 822R/L, 823R/L like in FIG. 8A to close/open spool inlet valve 115R/L. This configuration is simplified in that only five major moving parts are included, i.e., (1) power piston shaft 141/cam mechanism 144/Wankel piston 3103, (2-3) two pump chambers 8708R/L and (4-5) two biasing elements 8709R/L. Considering that biasing elements 8709R/L in some embodiments are permanently bonded to pump chambers 8708R/L, there will be only three major moving parts, greatly simplifying the construction.

Figure 8C:
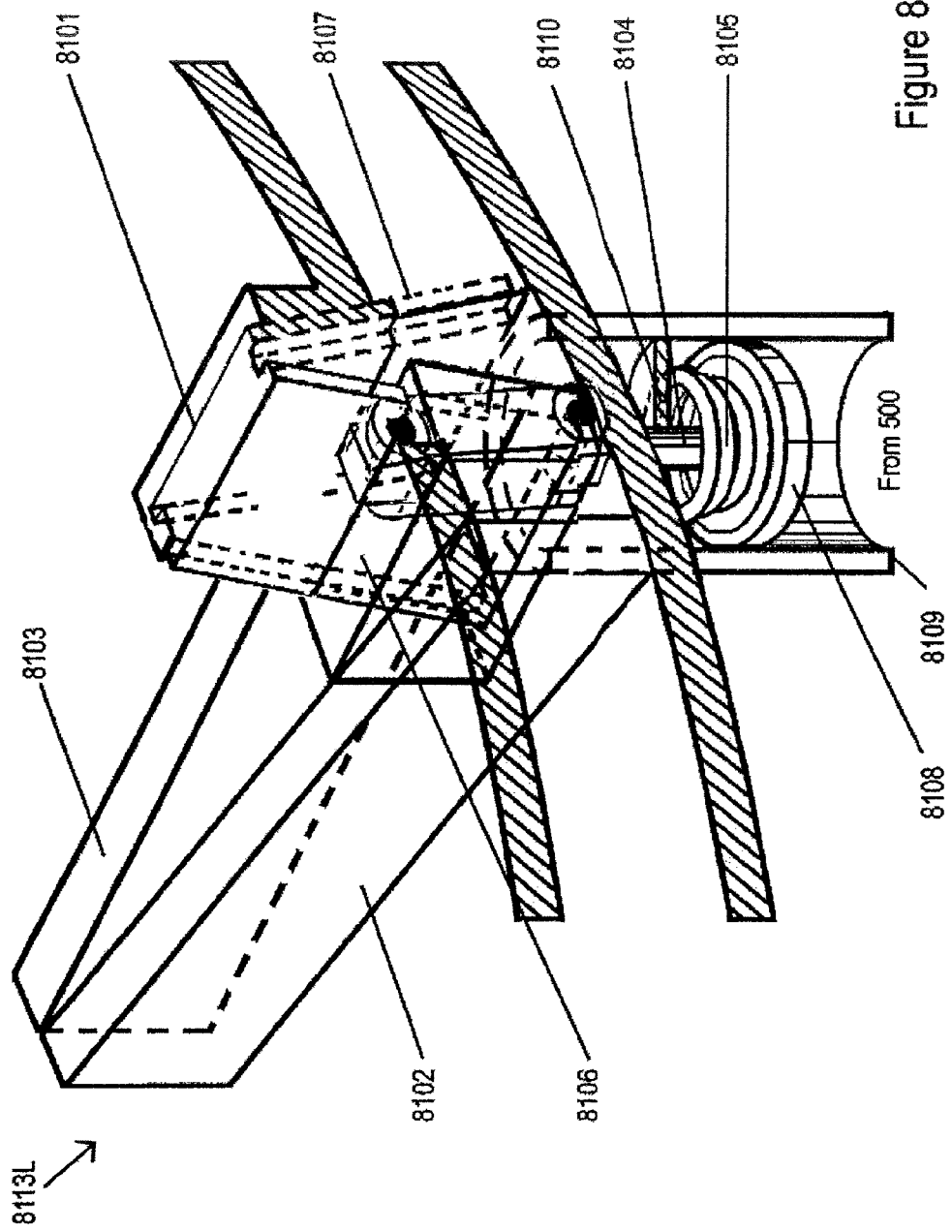
FIG. 8C is a schematic, perspective view of the structure of a pump piston/biasing element shown in FIG. 8B.

In one or more embodiments, pump piston 8113R/L has a variable size and incorporates the function of a variable conditions regulator 1001 as described herein below. This is realized, for example, by a tweezer- or inverted V-shaped volume regulator 8101 inserted between two opposite walls 8102, 8103 of each of pump piston/biasing element 8113 R/L. A schematic, perspective view of the structure of one of the pump piston/biasing elements, e.g., pump piston/biasing element 8113L, is shown in FIG. 8C. As shown in FIG. 8C, volume regulator 8101 includes two side walls 8106, 8107 each engaging one of the walls 8102, 8103 of pump piston/biasing element 8113 L, respectively. The walls 8106, 8107 are slanted with respect to each other to form a V-shaped "wedge". A post 8104 supports the wedge from below. The post 8104 itself is supported by a regulator piston 8108 that is moveable within a cylinder 8109. A spring 8110 is provided around post 8104, between piston 8108 and the inner wall of cylinder 8109 for biasing piston 8108 and hence post 8104 toward a neutral position. The heated working fluid from heating exchanger 500 is accessed to cylinder 8109, below piston 8108.

Volume regulator 8101 operates similarly to variable conditions regulator 1001 described herein below. In short, when the pressure of heated working fluid is high, piston 8108, post 8104, and the wedge will be raised upward, the latter causing walls 8102 and 8103 to spread away from each other. Therefore, the effective volume of the fluid pump within the pump chamber 8708 decreases, allowing a higher compression ratio of the working fluid. Similarly, when the pressure of heated working fluid is low, piston 8108, post 8104, and the wedge will be lowered downward, the latter allowing walls 8102 and 8103 to move toward each other. Therefore, the effective volume of the fluid pump within the pump chamber 8708 increases, resulting in a lower compression ratio of the working fluid. In one or more embodiments both walls 8102, 8103 are moveable. In some further embodiments, only one of the walls 8102, 8103 is moveable.

Figure 8D:
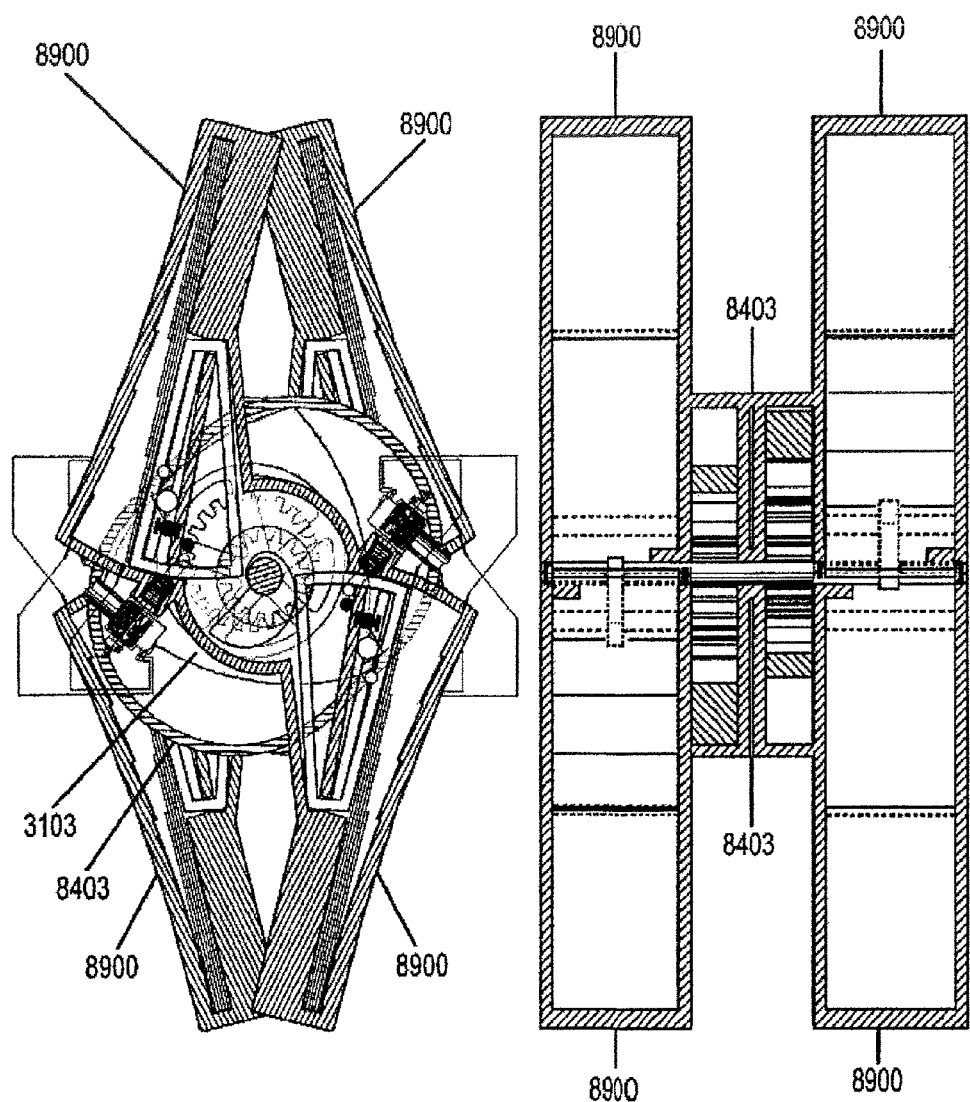
FIG. 8D includes schematic side and top views of an embodiment in which two Wankel engines are combined.

FIG. 8D includes schematic side and top views of an embodiment in which two Wankel engines 8403 are put together side by side with their Wankel pistons 3103 being 90 degrees from one another. Four respective fluid pumps 8900 are positioned on the outside walls of each of the two Wankel engines 8403. Considering that the biasing elements of the four fluid pumps 8900 in some embodiments are permanently bonded to the respective pump chambers, there will be only five major moving parts (i.e., (1) power piston shaft 141/cam mechanism 144/Wankel pistons 3103, and (2-5) four pump chambers), greatly simplifying the construction.

Figure 10:
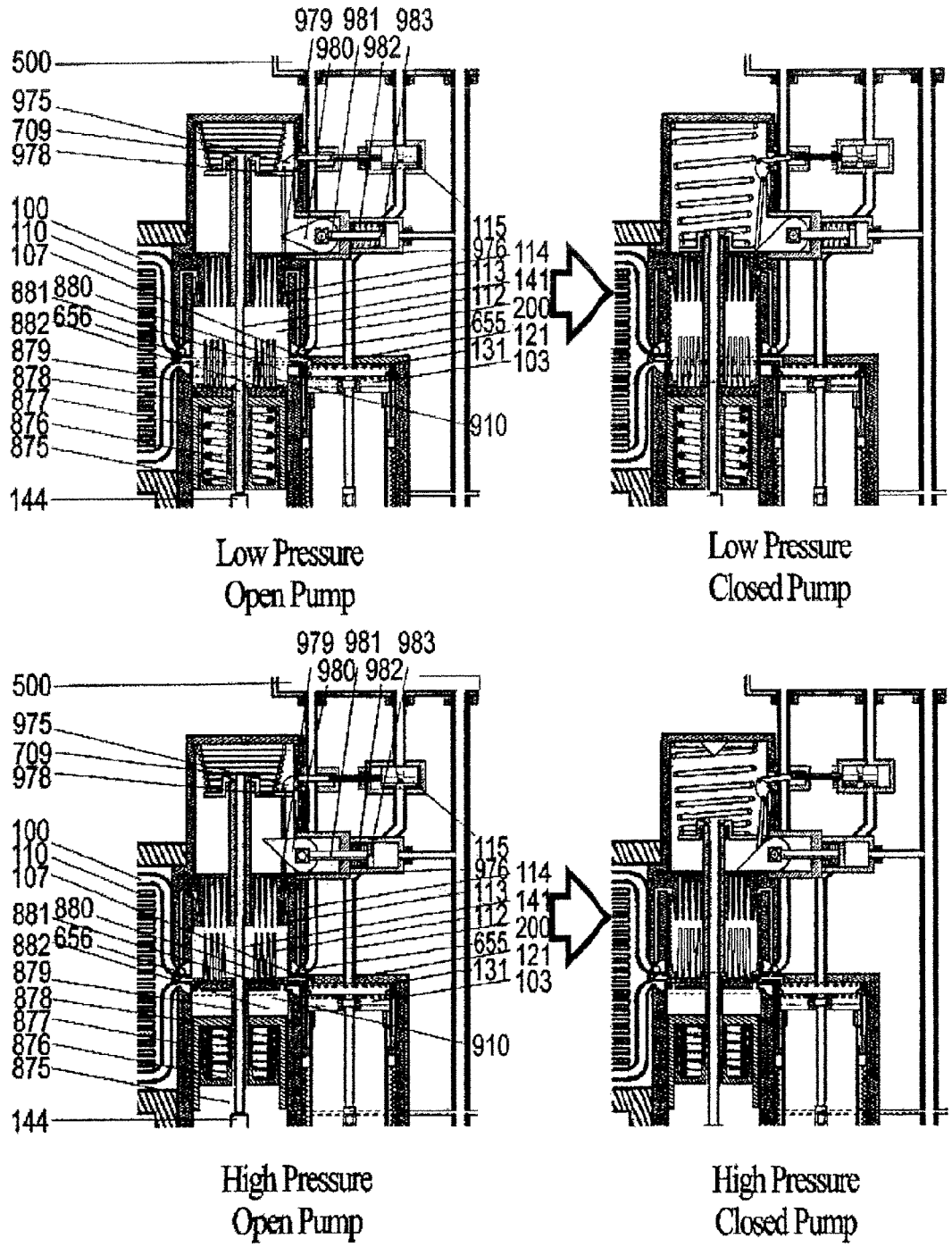
FIG. 10 includes simplified cross-sectional views of a variable conditions regulator in accordance with an embodiment.

FIG. 10 discloses a variable conditions regulator for use in one or more embodiments, such as those disclosed with respect to FIGS. 3-7. To optimize the expansion capability of the working fluid under varying conditions of heating exchanger 500, especially when heating exchanger 500 is powered by solar energy, the Soony engine in some embodiments is able to self-adjust with the varying temperature/pressure conditions imposed.

For example, as the temperature/pressure of the heated working fluid in heating exchanger 500 rises, since the volume of piston chamber 104 is fixed, the size of the initial volume of first pump sub-chamber 114 decreases to accommodate the higher expansion ratio of the high pressure. Since the working fluid has a greater density at the higher pressure, the adjacent allows for a greater mass flow even with the smaller initial volume of first pump sub-chamber 114. Likewise, for a medium pressure/temperature in heating exchanger 500, the initial volume of first pump sub-chamber 114 enlarges to accommodate the lower temperature/pressure condition.

For instance, in the numeric example disclosed above, the volume enlargement for a temperature reduction from 212° F. to 170° F. is 108.8%. The volume reduction for a temperature increase from 212° F. to 300° F. is 118.9%. The initial volume of first pump chamber 114, i.e., 2.1778 units at 212° F., is divided by the above percentages to determine the volume change.

In particular, when the temperature and pressure drop from the high of 212° F. and 480 psi to, e.g., 170° F. and 408.4 psi which will happen with solar energy under variable sun conditions, the initial volume (at TDC) in first pump sub-chamber 114 increases from 2.1877 units to 3.0913 units or by ~171%. By regulating these volumes (which are interchangeable), the variation insures that the total volume being expanded during the downstroke of the engine will always conform to the optimum expansion parameters of the working fluid at any given temperature/pressure to optimize the work potential imposed by varying conditions of the sun. The same is true for utilization of stack waste heat.

The initial volume of first pump sub-chamber 114 can be regulated in some embodiments by the variable conditions regulator 1001 disclosed in FIG. 10. Variable conditions regulator 1001 includes regulator piston 875 being acted upon from below by the heated working fluid of heating exchanger 500, a moveable pump floor 882, and a regulator spring 880 between moveable pump floor 882 and regulator piston 875. In some embodiments, the surface area of regulator piston 875 is larger than moveable pump floor 882. Although not shown, the overall weight of variable conditions regulator 1001 is weighted in some embodiments sufficiently so as to minimize the vibrations caused by the varying pressure conditions. The arrangement will insure that the action of variable conditions regulator 1001 is deliberate but stable with changing pressures. Other arrangements for the variable conditions regulator are, however, not excluded. For example, a solenoid with variable contact points are used in some embodiments.

With rising pressures, the regulator piston 875, regulator spring 880 and moveable pump floor 882 will encroach into the initial volume of first pump sub-chamber 114 of fluid pump 700. The higher the pressure, the higher the compression ratio, e.g., in the specifically disclosed example, at 408.4 psi, the ratio is 1.3175, while at 480 psi the ratio is 1.4571, and at 653 psi, the ratio is 1.7329.

FIG. 10 shows variable conditions regulator 1001 at low and high pressures, respectively, of the heated working fluid in two states, i.e., open pump and closed pump. A switching mechanism for adjusting the close/open timings of spool inlet valve 115 is also illustrated in FIG. 10 although it is not necessary for both variable conditions regulator 1001 and the switching to be included in the same configuration.

Thus, in the illustrated configuration, two aspects vary in accommodating the regulation: 1) the initial volume of first pump sub-chamber 114 is controlled by regulator piston 875 and 2) the length of travel of spring bracket 987 to switch open and closed spool inlet valve 115 is controlled by a wedge 980. In some embodiments of the first aspect, the varying initial volume of first pump sub-chamber 114 regulated by regulator piston 875 is further stabilized by a weighted mechanism (not shown). Again, other arrangements, such as a solenoid with variable contact points, are not excluded.

In some embodiments of the second aspect, the variable switching mechanism accommodates the varying travel length of spring bracket 975 under varying temperature/pressure conditions by controlling the contact points of the switch mechanism. In particular, the varying distance of the contact points for the switch mechanism is regulated by filling the gap at the low contact point of the arm of spool inlet valve 115 by inserting wedge 980. As the wedge 980 fills the gap, the spring bracket 987 will contact with the wedge 980 which will in turn contact with blocker/contact point 979 on the arm of spool inlet valve 115 and thus pull closed the spool inlet valve 115. The gap closure is regulated by the changing pressures acting on switch piston 983. The closing of spool inlet valve 115 can also be regulated electronically. However, the above mechanical switch eliminates the need for such additional complexity.

When the heating exchanger 500 is at a high pressure and the pump is opened (lower, left figure), regulator piston 875 is moved up by the high pressure heated working fluid to an upper contracted position. As a result, moveable pump floor 882 is also moved to an upper position with the first pump sub-chamber 114 being at a reduced volume. A switch piston 983 is pushed by the high pressure heated working fluid to extend wedge 980 to fill the gap in the shortened travel of the contact point of spring bracket 987 as it moves on contact point 979 to eventually close spool inlet valve 115.

When the heating exchanger 500 is at a high pressure, and the pump is closed (lower, right figure), spring bracket 987 has moved to contact with the extended wedge 980 which in turn contacts with contact point 979 to pull closed spool inlet valve 115.

When the heating exchanger 500 is at a low pressure and the pump is opened (upper, left figure), regulator piston 875 is in a down, contracted position. Moveable pump floor 882 of the pump is also in a corresponding down position with the first pump sub-chamber 114 at a higher volume. Due to the low pressure of the heated working fluid, wedge 980 is retracted compared to FIG. 10B to open the travel of the contact point of spring bracket 987 as it moves on contact point 979 to eventually close spool inlet valve 115.

When the heating exchanger 500 is at a high pressure, and the pump is closed (upper, right figure), the spool inlet valve 115 is now closed. The spring bracket 987 has moved to contact with the thin tip of wedge 980 which in turn contacts with blocker point 979 to pull closed spool inlet valve 115.

Figure 11:
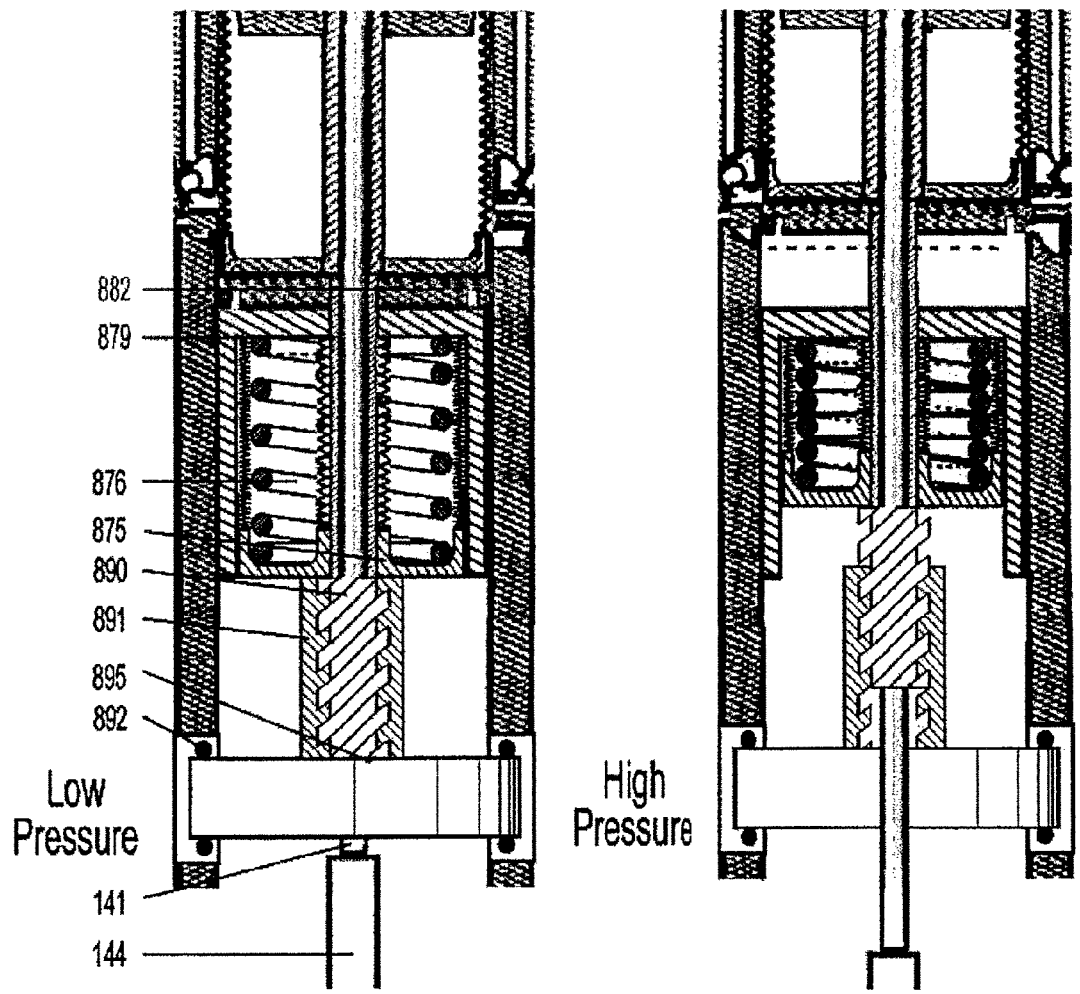
FIGS. 11-12 are simplified cross-sectional views of variable regulator stabilizers in accordance with one or more embodiments.

An alternative configuration of variable conditions regulator 1001 has been discussed with respect to FIG. 8C A variable regulator stabilizer in accordance with in one or more embodiments is disclosed in FIG. 11. The gyro stabilizer is used as an example of means for stabilizing the slow action of the variable conditions regulation. Any other means for achieving the same or similar stabilizing effects are covered by this disclosure. For example, the wedge described above with respect to FIG. 8C also achieves stabilizing effects. As discussed above, variable conditions regulator 1001 varies the initial volume of first pump sub-chamber 114 to accommodate varying pressure/temperature conditions of heating exchanger 500, e.g., imposed by the variable heat of the sun or waste heat. The variable conditions regulator 1001 is operated by the pressure of the heated working fluid in heating exchanger 500. However, the pressure conditions in fluid pump 700 and first pump sub-chamber 114 may vary considerably. The mean force that regulates the floor position, i.e., moveable pump floor 882, of fluid pump 700 can be designed into the system. However, the effect of the fluctuation of pressures needs to be stabilized so that the mechanism and the pump volume remain stable under the varying conditions. Therefore, gyro stabilizer (gyrating stabilizer) 890 is provided. Gyro stabilizer 890 has a fixed position but between ball bearings 892 that allow gyro stabilizer 890 to freely gyrate clockwise and counterclockwise with the push/pull fluctuation of regulator piston 875 and, therefore, through the shaft 879, the moveable pump floor 882. Because gyro stabilizer 890 changes directions each time a reverse movement occurs, that movement is stabilized.

Figure 12:
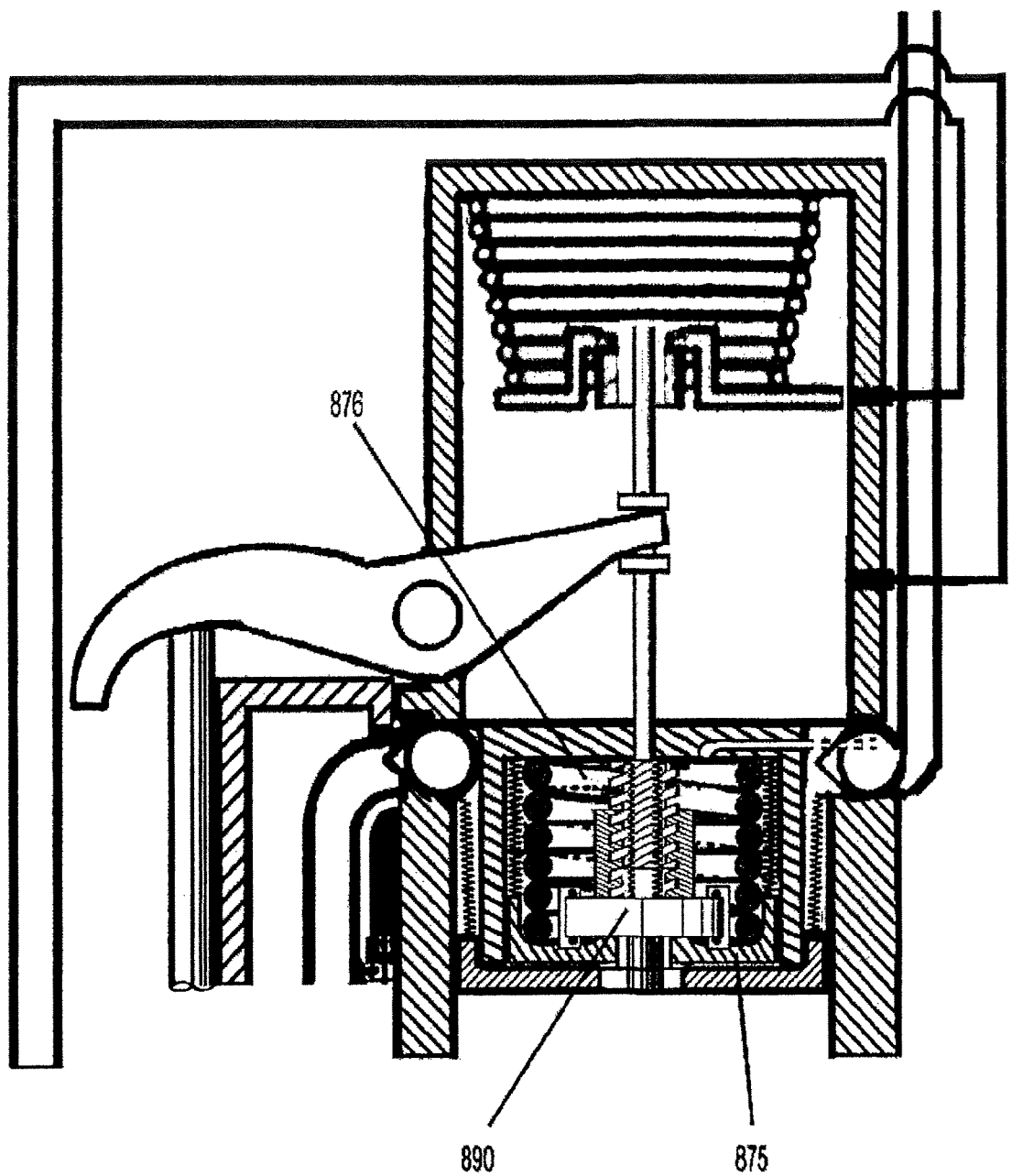

Gyro stabilizer 890 is in some embodiments positioned within regulator spring 876, as shown for example in FIG. 12, for reducing the size of the device. Two bellows structures (not numbered are included to prevent leakage).

Figure 13A:
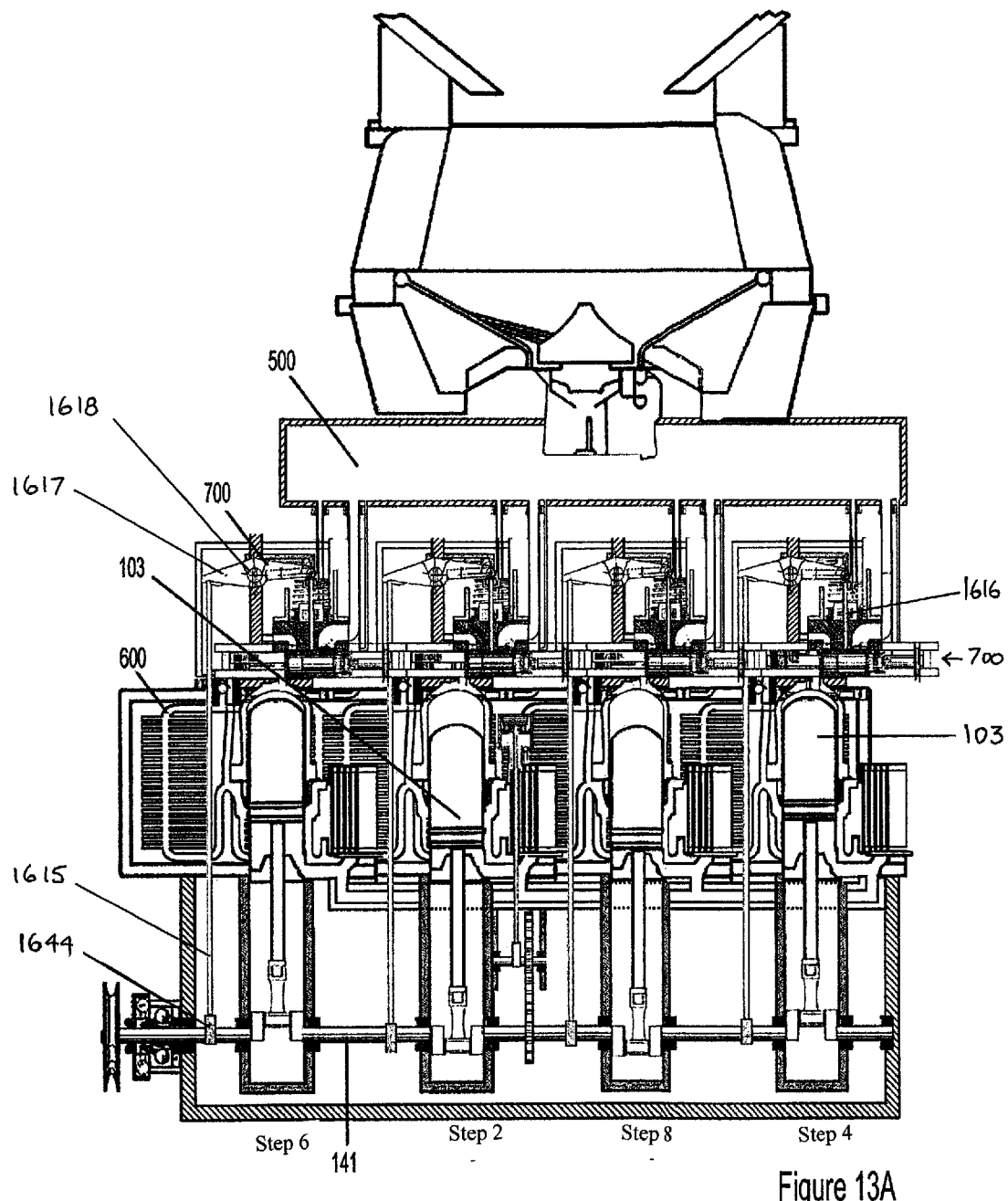
FIGS. 13A-13B are simplified cross-sectional views of various adapted Kockums engines in accordance with one or more embodiments.
Figure 13B:
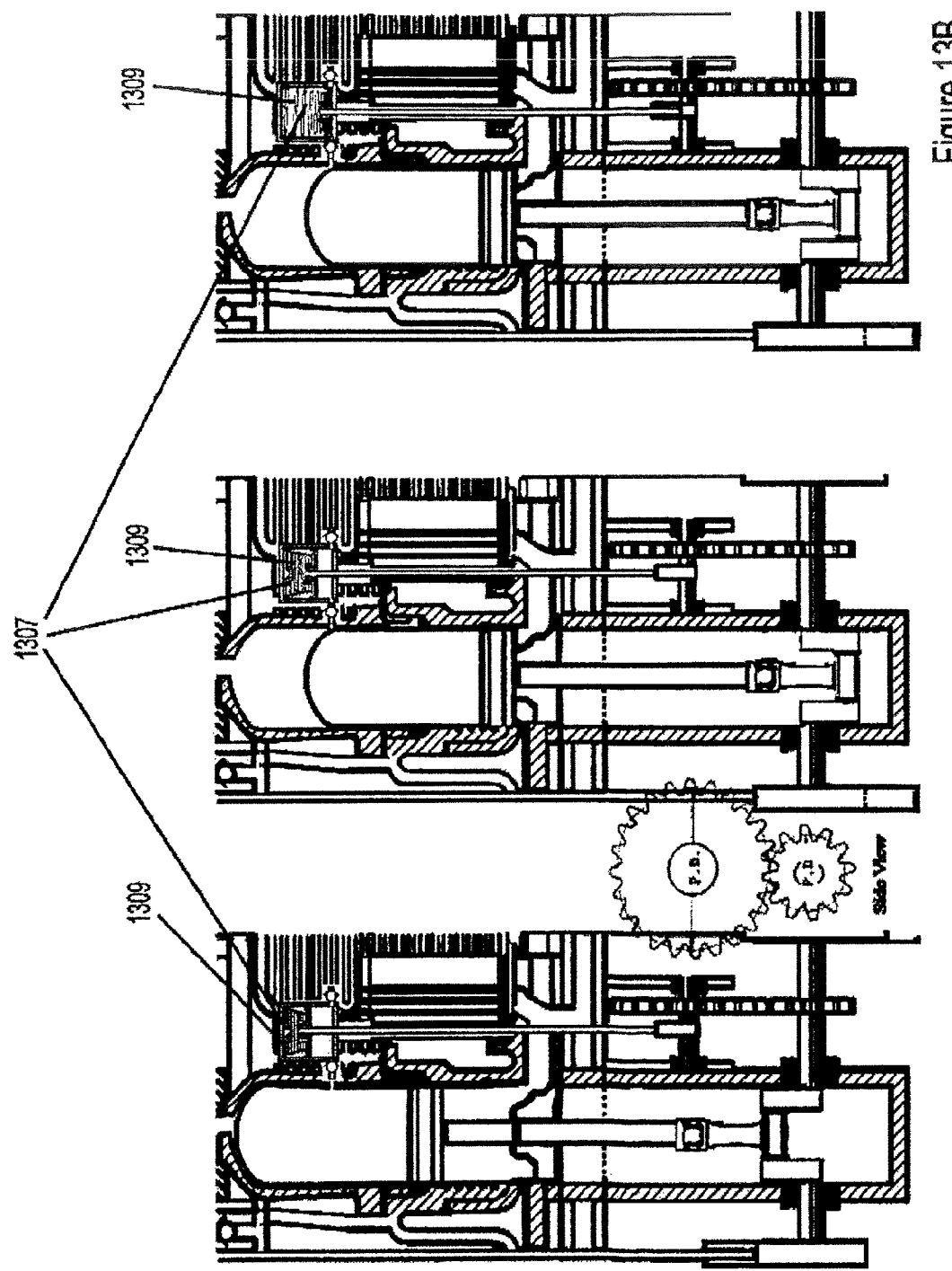
Figure 16:
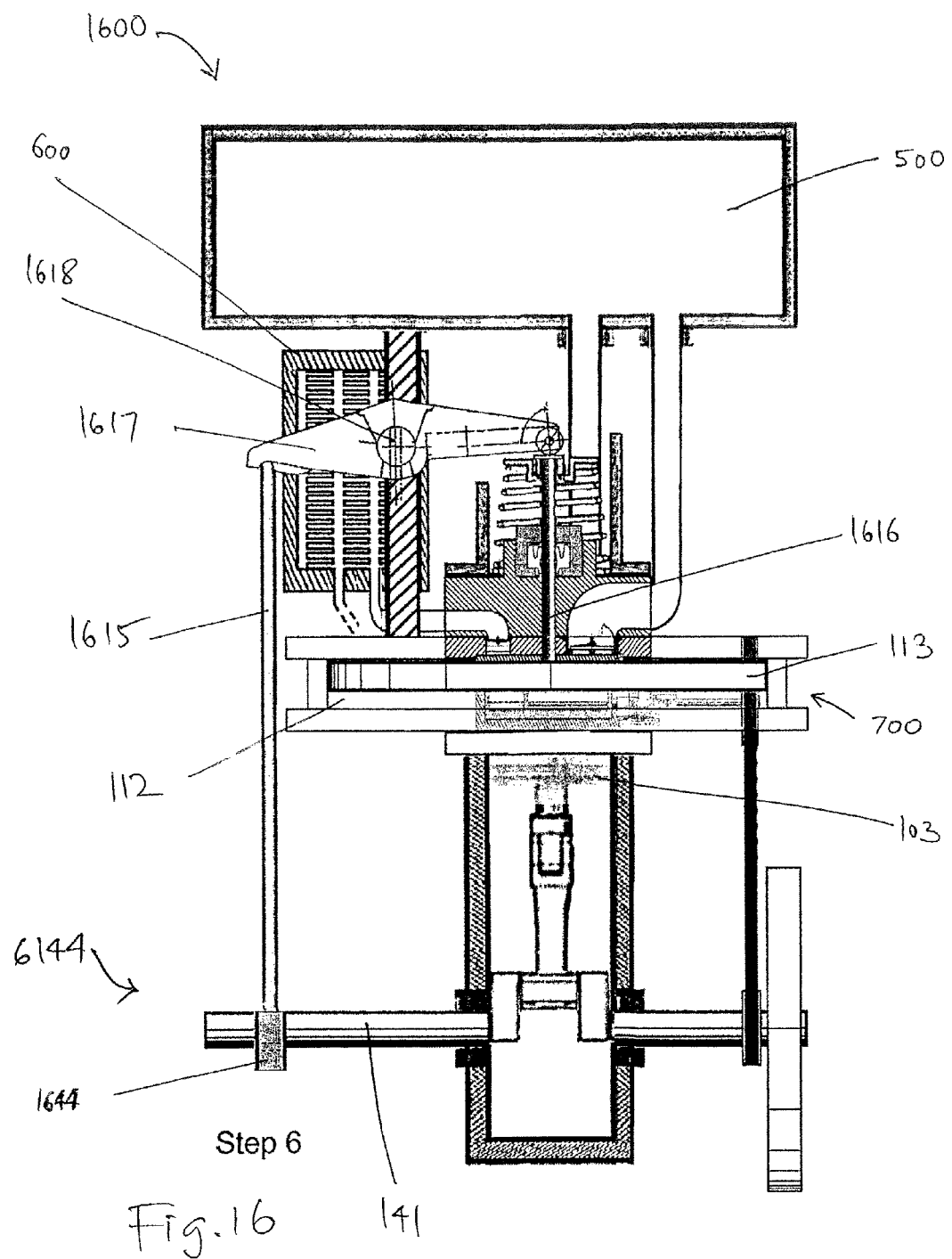
FIG. 16 is a schematic view of a Soony Engine with a relatively short pump piston traveling distance in accordance with one or more embodiments

FIGS. 13A-13B show various exemplary configurations where an engine in accordance with in one or more embodiments, such as any Soony Engine disclosed above and/or herein below, is integrated with a Stirling engine such as one developed by Kockums AB of Sweden (hereinafter Kockums engine). Specifically, FIG. 13A shows an exemplary configuration where fluid pumps 700, which have a relatively short pump piston traveling distance as will be described herein with respect to FIG. 16, are used.

The Kockums kinematics Stirling engine is a four-cylinder reciprocating engine receiving compressed and heated hydrogen gas from a Solar Receiver to drive the Stirling cycle. A Stirling engine's cylinder block incorporates four sealed cylinder assemblies (pistons, piston rod and connecting rods) along with coolers, regenerators and heater heads.

The "back pressure" configuration of the Kockums engine refers to the "back pressure" of the existing Kockums recompression which is behind the power piston during the downstroke. The expansion and compression are occurring simultaneously operating on the same rotary journal axis. Because the Soony engine in accordance with one or more embodiments uses the same cylinder to house both the expansion and compression chambers, it is adaptable to the Kockums engine by neutralizing the back pressure compression chamber, allowing that chamber to be the low temperature/pressure cooling sink. The adaptation, as exemplified in FIGS. 13A-13B, will maintain the continuous back pressure condition of the cooling sink by connecting all four adapted backpressure chambers so that the total volume will balance out to undergo a zero volumetric change.

Specifically, the fluid and pressure behind the main drive piston during the expansion downstroke is held at the low and stable sink pressure during the downstroke by in one or more of (1) using the existing Kockums cooling system to maintain a low temperature/low pressure cooling sink, (2) sealing off the upstroke valve access to the rest of the circulatory system of the existing Kockums compression chamber and transform the existing Kockums compression chamber to the back pressure sink, (3) interconnecting the transformed back pressure sink chambers to maintain a constant volume in the sink to avoid back pressure compression, (4) minimizing the bleeding or leakage via the power piston between the transformed expansion/compression chambers and the converted cooling sink, (5) providing a fluid pump that returns the leaked fluid back to the circulatory system, and (6) converting the expansion chamber to the dual function of an expander and compressor chamber (the expansion/compression chamber) so that the piston does its positive work during the downstroke and negative work (or pumping into another Soony engine as discussed with respect to, e.g., FIG. 3) during the upstroke.

The walls of the adapted engine's expansion/compression chamber are constructed in some embodiments of a material that does not retain or absorb heat. Ceramic that can handle the abrasion of a engine piston is a possibility. The leakage between the expansion/compression chamber and the cooling sink is held to zero.

(1) Using the existing Kockums engine's cooling system to create a low temperature, low pressure cooling sink The four cylinder configuration of the Soony engine in accordance with one or more embodiments matches the four cylinder configuration of the Kockums as shown in FIG. 13A. Because the four pistons of the four cylinders are evenly spaced so that the volume of one cylinder chamber has the opposite volume of the other which means that the four journal are 90° apart forming the shape of a cross, by interconnecting the four back pressure volumes (of the former compression chambers) while isolating and utilizing the cooling coils of the former Kockums compression chambers, the mean volume of the sink will remain constant and at the low pressure/temperature level occurring at BDC of the working stroke.

(2) Sealing off the upstroke valve access between the existing Kockums compression chamber and the altered Soony cooling system In converting the Kockums to the Soony engine in accordance with one or more embodiments, the Kockums engine's mean allowing the valve access during the upstroke is sealed off permanently from the circulatory system.

(3) Interconnecting the recompression chambers to maintain a constant volume to avoid compression To maintain the constant low pressure in the cooling sink, the former Kockums compression chambers are interconnected in accordance with an embodiment. This insures that the volume encroachment during the downstroke of each power stroke will equal the volume expansion during the upstroke since the combined volumetric change of the cross action equal zero.

(4) Minimizing the bleeding or leakage via the power piston between the expansion chamber and the converted cooling sink If there were no leakage and the mass flow of the working fluid into the cooling sink, the adapted engine would provide the constant ideal temperature/pressure condition. However, in reality, unless a physical barrier is provided (such as a bellows as discussed with respect to one or more embodiments) for each working piston, the working fluid will leak into the low pressure cooling sink.

(5) Providing a fluid pump that returns the leaked fluid back to the circulatory system The leaked fluid is passed back into the circulatory system using a rotary pump or the device shown in FIG. 13B that uses a piston to dump that fluid back into the circulation at BDC when the pressures at BDC are essentially equal to the sink. As shown in FIG. 13B, this sink pump 1307 functions at the low end of the pressure cycle. Instead of pumping during the high pressure balance at TDC, the sink pump 1307 pumps the leaked fluid back into circulation during the low pressure balance at BDC. Because the leakage is expected to be minimum, a gear system is provided allowing the pumping action to occur only after several cycle rotations of the engine. The spring 1309 is cocked as with the fluid pump 700 of the circulatory system and released at the balance pressure condition just like the circulatory system. However, the sink pump 1307 will achieve its pumping at the low pressure point.

(6) Converting the expansion chamber to the dual function of the expansion/compression chamber so that the piston does its positive work during the 4 downstroke and negative work (or pumping into another Soony engine as discussed with respect to, e.g., FIG. 3) during the four upstrokes. This small internal pump configuration is consistent with the principles of the fluid pump 700 described above.

The Soony apparatus in accordance with one or more embodiments will be installed on the head of each Kockums engine's working cylinder as exemplarily shown in FIGS. 13A-13B and will function as previously explained.

The following alterations occur in some embodiments to integrate the Soony engine as disclosed in one or more embodiments into the Kockums engine:

1) Expansion working cylinder and its power piston will be converted to function in a dual capacity as a combined expansion and compression chamber. First the valve feed from the expansion chamber during the upstroke and the back pressure compression chamber is eliminated so that the back pressure compression chamber ceases to operate as a compression anti-work chamber and become merely a low pressure sink. Second, this low pressure sink will be interconnected to the other three (out of four) sinks to insure that the low pressure remains constant. In other words, the compressor chamber of the Kockums engine will be converted to the low pressure sinks with the four chambers which are interconnected to insure pressure equalization and stabilization. The cooling system formerly used in this compressor of the Kockums engine will be used to maintain this low temperature pressure. The fluid in this low temperature pressure sink will be isolated from the cycling working fluid as much as is possible.

2) The combined expansion/compression work and anti-work chamber of the adapted configuration will have an intake and an outlet.

3) The regenerator that occurs with the adaptation of the Kockums engine will occur in the large high temperature/pressure reservoir as taught above. Since the working fluid is completely recycled out of the engine body, the efficiency is significantly improved.

Figure 14:
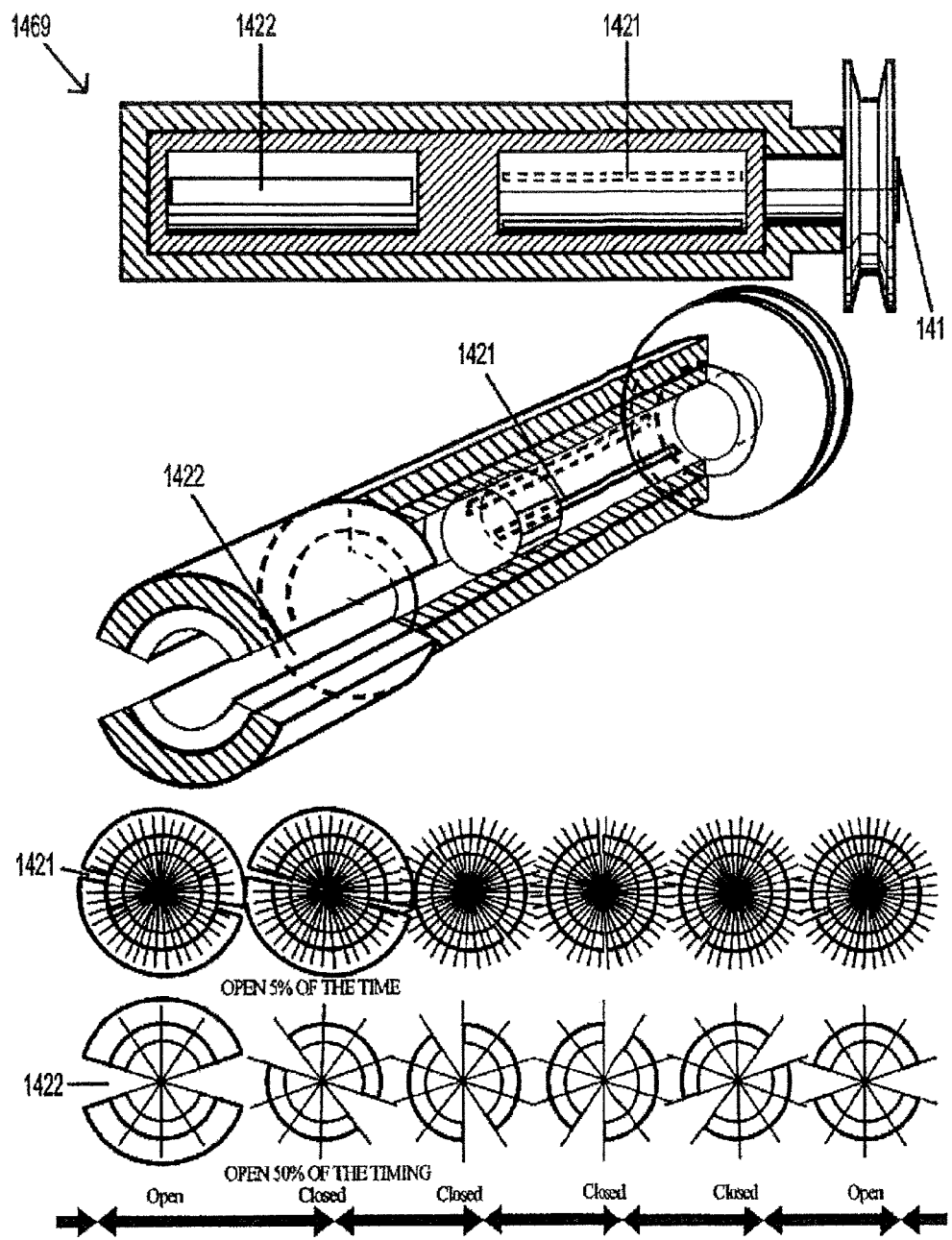
FIG. 14 discloses a rotary shutter valve for use with in one or more embodiments.

FIG. 14 discloses a rotary shutter valve for use with any Soony Engine disclosed herein.

The Soony engine operation as disclosed in one or more embodiments depends on achieving a rapid exchange of volumes in contrast to the Stirling engines achieving an exchange of heat. An effective volume exchange greatly depends on the rapidity of the flow of the circulating working fluid. To ensure rapid and reliable flow between heating exchanger 500 and expansion chamber 107, and between the latter when functioning as a compression/pump encroachment chamber and cooling exchanger 600, the valve openings are in accordance with some embodiments made as wide as possible.

To this end, a rotary shutter valve 1469 is provided with two compartments 1421, 1422, for intake (like inlet port 121) and one for exhaust (like exhaust port 122), respectively. In some embodiments, the intake 1421 is open about 1/20th or 5% of the time of the total stroke, and the exhaust 1422 is open about 50% of the time, i.e., during the upstroke from BDC to TDC. In some embodiments, the exhaust 1422 is closed before the intake 1421 opens. The valve slit(s) of exhaust 1422 is/are larger than that/those of the intake 1421, in accordance with some embodiments.

In one or more embodiments, the rotary shutter valve 1469 continually spins at a constant rate, being driven directly or indirectly by power piston shaft 141. The rate of the opening of the exhaust 1422 and the intake 1421 of the exchange occurs in parallel to the rate of the change of volume. The intake 1421 is opened in some embodiments immediately after the exhaust 1422 closes. In one or more embodiments, the long slit of the valve openings runs across the diameter of the head of the power piston 103 and the compression/pump encroachment chamber.

Figure 15:
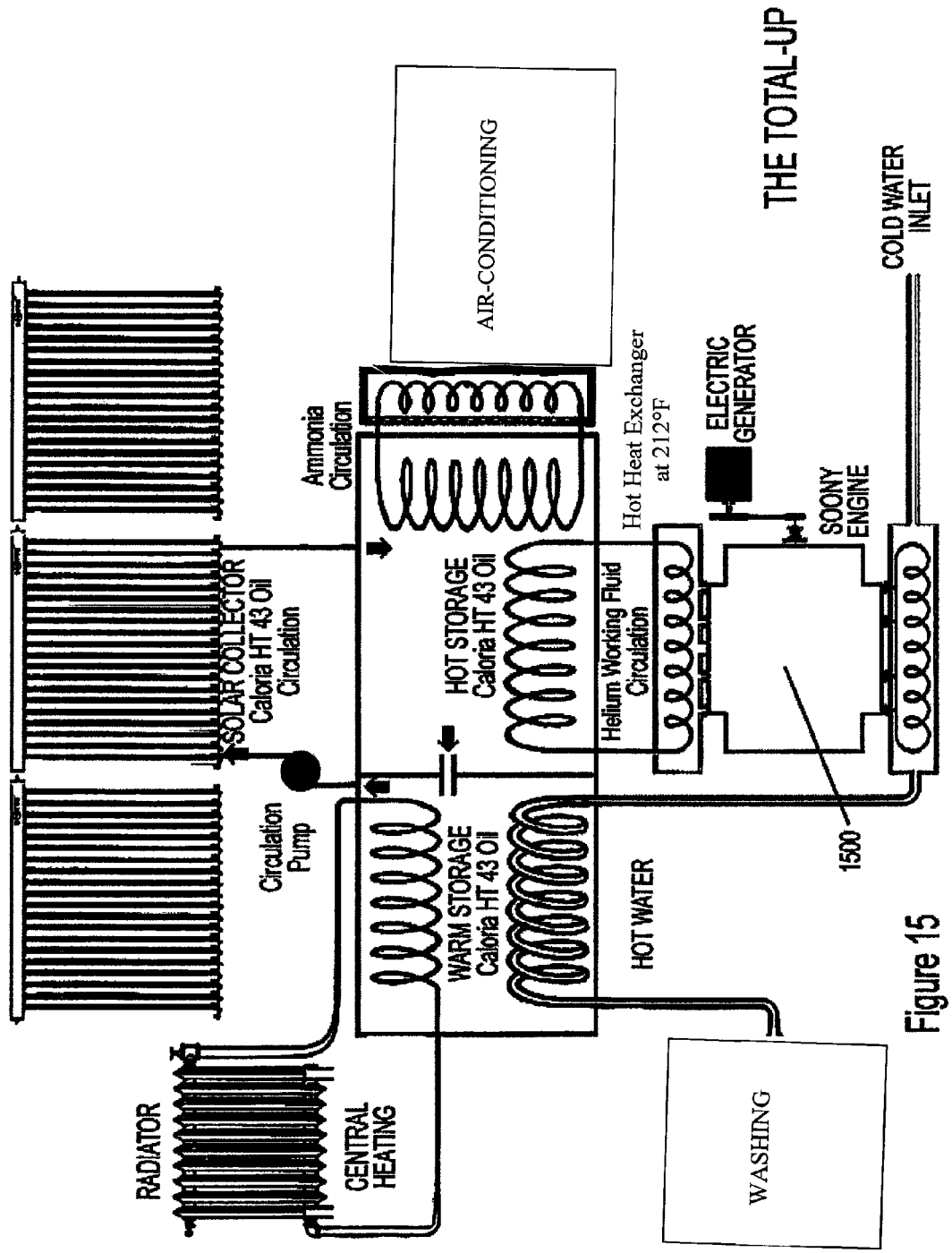
FIG. 15 discloses a particular application of a highly efficient combined heat to power (CHP) engine in accordance with one or more embodiments.

FIG. 15 discloses a particular application, in accordance with one or more embodiments, of a highly efficient combined heat to power (CHP) engine 1500. The thermal CHP engine in one or more embodiments as exemplarily shown in FIG. 15 is fully integrated into a multi-purpose solar total utilities package (electric, hot water, heating, and AC) and will not only heat and cool buildings but will also generate electric power 24/7 year around. Possible heat sources includes but are not limited to 1) passive solar heat for homes and commercial buildings and/or 2) with high temperatures for solar power plants and/or 3) for utilization of industrial stack waste heat.

FIG. 16 discloses a Soony Engine 1600 in accordance with one or more embodiments. Soony Engine 1600 is characterized in a short traveling distance of the pump piston 113. As noted above, the short traveling distance reduces the drag on the pump piston 113. The short traveling distance requires a similarly short pump cylinder. To ensure that Soony Engine 1600 has the adequate volume in the second pump sub-chamber 112 (Pump Chamber), the area of the pump piston 113 and, hence, the area of the pump cylinder, is enlarged appropriately as exemplarily illustrated in FIG. 16.

The traveling distance of power piston 103 is maintained to be relatively large (larger than the traveling distance of pump piston 113) to ensure proper power output. A modified cam mechanism 6144 is provided to ensure that the larger traveling distance of power piston 103 is properly converted into the shorter traveling distance of pump piston 113. The modified cam mechanism 6144 includes a cam 1644 on power piston shaft 141 and connected by links 1615 and 1616, as well as a rocker 1617 (which rocks about a pivot 1618) to the pump piston 113. In an example, the cam 1644 has a profile closer to a circle than cam 144L/R discussed in FIG. 5. The operation of the modified cam mechanism 6144 is similar to the previously discussed embodiments and will not be repeated herein.

A particularly advantageous configuration of pump piston 113 includes a light weight, yet strong like an aircraft wing, material for the pump piston 113, such as titanium, carbon fiber-reinforced material or the like.

The invention claimed is:

1. An adiabatic expansion heat engine, comprising:
a piston chamber;
a power piston moveable within the piston chamber for running on a working fluid in a high pressure state receivable from a heating exchanger and for exhausting said working fluid in a low pressure state; and
a fluid pump for transferring the working fluid in the low pressure state back to the high pressure state of the heating exchanger, the fluid pump comprising:
a pump piston; and
an expansion chamber and a pump chamber which are disposed on opposite sides of the pump piston, and which have varying volumes as the pump piston is moveable between the expansion chamber and the pump chamber;
wherein
the expansion chamber and the piston chamber are fluidly communicated to define together a working chamber for adiabatic expansion of the working fluid therein during a downstroke of the power piston;
the working chamber is controllably, fluidly communicable with the pump chamber during an upstroke of the power piston for compressing the working fluid in the low pressure state into the pump chamber; and
when the power piston is at or near a top dead center (TDC) thereof, both the working chamber and the pump chamber are controllably, fluidly communicable with the heating exchanger so that pressures on opposite sides of the pump piston are equalized by the working fluid in the high pressure state metering from the heating exchanger, thereby balancing out the resistance to the working fluid being pumped, by a pumping action of the pump piston, from the low pressure state of the pump chamber back to the high pressure state of the heating exchanger.

2. The heat engine of claim 1, wherein the working fluid in the low pressure state is adapted to be compressed in the pump chamber under partially adiabatic conditions which are between isothermal conditions on the one hand and fully adiabatic conditions on the other hand.

3. The heat engine of claim 1, wherein (a) the metering of the working fluid in the high pressure state from the heating exchanger into the working chamber and (b) the pumping action are configured to occur simultaneously.

4. The heat engine of claim 1, wherein the pump piston is configured to progressively open the pump chamber during the upstroke of the power piston.

5. The heat engine of claim 1, further comprising:
a cooling chamber controllably, fluidly communicable between the working chamber and the pump chamber during the upstroke of the power piston, for cooling the working fluid in the lower pressure state before the cooled working fluid in the lower pressure state is compressed in the pump chamber.

6. The heat engine of claim 1, wherein the pump piston is adapted to be operatively driven, at least indirectly, by the power piston to encroach, together with the power piston, into the working chamber during the upstroke of the power piston.

7. The heat engine of claim 6, further comprising:
a connector for operatively connecting the pump piston to a movement of the power piston during the upstroke, and for operatively disconnecting the pump piston from the movement of the power piston during the downstroke.

8. The heat engine of claim 7, wherein said connector comprises a cam mechanism.

9. The heat engine of claim 1, further comprising:
a biasing element that biases the pump piston towards a closing of the pump chamber for causing said pumping action when the pressures on opposite sides of the pump piston are equalized by the working fluid in the high pressure state metering from the heating exchanger.

10. The heat engine of claim 1, wherein said fluid pump is a vapor pump adapted to forcibly move vapor of said working fluid in the low pressure state to the high pressure state of the heating exchanger without a vapor-liquid phase change.

11. The heat engine of claim 1, wherein a traveling distance of the pump piston between a TDC and a BDC (bottom dead center) thereof is shorter than that of the power piston.

12. The heat engine of claim 1, being a Kockum-based engine.

13. The heat engine of claim 1, being a Wankel-based engine.

14. The heat engine of claim 1, wherein
the pump chamber is elastically moveable between an initial position and a biased position, and
an elastic return of the pump chamber from the biased position to the initial position is sufficient for pumping the working fluid in the low pressure state into the heating exchanger when the pressures on the opposite sides of the pump piston are equalized by the working fluid in the high pressure state metering from the heating exchanger.

15. The heat engine of claim 1, wherein the pump piston comprises
two walls moveable relative to one another, and
a variable conditions regulator moveable in and out between the two moveable walls for automatically adjusting a size of the pump piston, and hence, the volume of the pump chamber, in response to at least one of (i) the pressure of the working fluid in the high pressure state metering from the heating exchanger or (ii) the temperature bracket.

16. The heat engine of claim 1, further comprising
a rotary shuttle valve for operatively closing and/or opening inlet and outlet openings of the expansion chamber at different timings.

17. The heat engine of claim 1, further comprising
a mechanism for operatively closing and/or opening inlet and outlet openings of the expansion chamber at different timings, wherein said mechanism is automatically adjustable in response to at least one of a pressure and a temperature of said working fluid in the high pressure state.

18. The heat engine of claim 1, further comprising
a solenoid valve for operatively closing and/or opening inlet and outlet openings of the expansion chamber at different timings in response to variable contacts distributed on the wall of the pump chamber.

19. A method of operating an adiabatic expansion heat engine which has a piston chamber, a power piston moveable within the piston chamber, a pump piston, an expansion chamber and a pump chamber disposed on opposite sides of the pump piston and having varying volumes as the pump piston is moveable between the expansion chamber and the pump chamber, wherein the expansion chamber and the piston chamber are fluidly communicated to define together a working chamber, said method comprising:
- adiabatically expanding a working fluid in a high pressure state in the working chamber during a downstroke of the power piston;
- fluidly communicating the working chamber with the pump chamber during an upstroke of the power piston for compressing the expanded working fluid in a low pressure state into the pump chamber; and
- when the power piston is at or near a top dead center (TDC) thereof, fluidly communicating both the working chamber and the pump chamber with a heating exchanger so that pressures on opposite sides of the pump piston are equalized by the working fluid in the high pressure state metering from the heating exchanger, thereby balancing out the resistance to the expanded working fluid being pumped, by a pumping action of the pump piston, from the low pressure state of the pump chamber back to the high pressure state of the heating exchanger.

* * * * *